United States Patent
Echigo et al.

(10) Patent No.: US 12,476,262 B2
(45) Date of Patent: Nov. 18, 2025

(54) METAL SUPPORT, ELECTROCHEMICAL ELEMENT, ELECTROCHEMICAL MODULE, ELECTROCHEMICAL DEVICE, ENERGY SYSTEM, SOLID OXIDE FUEL CELL, SOLID OXIDE ELECTROLYSIS CELL, AND METHOD FOR PRODUCING METAL SUPPORT

(71) Applicant: Osaka Gas Co., Ltd., Osaka (JP)

(72) Inventors: Mitsuaki Echigo, Osaka (JP); Yuji Tsuda, Osaka (JP); Hisao Ohnishi, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 553 days.

(21) Appl. No.: 17/914,236

(22) PCT Filed: Mar. 31, 2021

(86) PCT No.: PCT/JP2021/014086
§ 371 (c)(1),
(2) Date: Sep. 23, 2022

(87) PCT Pub. No.: WO2021/201195
PCT Pub. Date: Oct. 7, 2021

(65) Prior Publication Data
US 2023/0110742 A1     Apr. 13, 2023

(30) Foreign Application Priority Data

Mar. 31, 2020   (JP) .................................. 2020-065257

(51) Int. Cl.
*H01M 8/0254*     (2016.01)
*C25B 1/04*        (2021.01)
(Continued)

(52) U.S. Cl.
CPC ............. *H01M 8/0254* (2013.01); *C25B 1/04* (2013.01); *C25B 9/63* (2021.01); *C25B 15/08* (2013.01);
(Continued)

(58) Field of Classification Search
CPC ........... C25B 1/04; C25B 1/23; C25B 15/021; C25B 15/08; C25B 15/081; C25B 9/60;
(Continued)

(56) References Cited

U.S. PATENT DOCUMENTS

2013/0316263 A1\*  11/2013  Roshanzamir ........ H01M 8/026
                                                            429/480
2019/0393536 A1\*  12/2019  Toda .................... H01M 8/0625
(Continued)

FOREIGN PATENT DOCUMENTS

JP            2010232007 A     10/2010
JP             201333617 A      2/2013
(Continued)

OTHER PUBLICATIONS

Machine translation JP2013033618A (Year: 2013).\*
Machine translation JP2017174516A (Year: 2017).\*

*Primary Examiner* — Victoria H Lynch
(74) *Attorney, Agent, or Firm* — The Webb Law Firm

(57) ABSTRACT

In a metal support mostly used for a metal-supported solid oxide fuel cell (SOFC), a SOFC system that improves the power generation efficiency by allowing a gas to smoothly flow into or flow out from the through-holes is achieved. A metal support is formed in a plate shape as a whole and has a plurality of through-holes penetrating from a front surface on which an electrode layer is provided to a back surface, and the metal support has inclined through-holes, as the through-holes each of which has a central axis inclined with respect to a thickness direction.

15 Claims, 10 Drawing Sheets

(51) Int. Cl.
*C25B 9/63* (2021.01)
*C25B 15/08* (2006.01)
*H01M 4/88* (2006.01)
*H01M 8/0232* (2016.01)
*H01M 8/1246* (2016.01)
*H01M 8/12* (2016.01)

(52) U.S. Cl.
CPC ....... *H01M 4/8803* (2013.01); *H01M 8/0232* (2013.01); *H01M 8/1246* (2013.01); *H01M 2008/1293* (2013.01)

(58) Field of Classification Search
CPC ... C25B 9/63; C25B 9/75; C25B 9/77; H01M 2008/1293; H01M 4/8803; H01M 8/0232; H01M 8/0254; H01M 8/0618; H01M 8/0637; H01M 8/1246; Y02E 60/36; Y02E 60/50; Y02P 70/50
See application file for complete search history.

(56) References Cited

U.S. PATENT DOCUMENTS

| | | | |
|---|---|---|---|
| 2021/0028478 A1 | 1/2021 | Echigo et al. | |
| 2021/0043956 A1* | 2/2021 | Zhu | H01M 8/1213 |
| 2021/0119228 A1 | 4/2021 | Echigo et al. | |

FOREIGN PATENT DOCUMENTS

| | | | | |
|---|---|---|---|---|
| JP | 201333618 A | | 2/2013 | |
| JP | 2017174516 A | * | 9/2017 | ............. H01M 4/86 |
| WO | 2019189843 A1 | | 3/2019 | |
| WO | 2019189913 A1 | | 3/2019 | |

* cited by examiner

METAL SUPPORT, ELECTROCHEMICAL ELEMENT, ELECTROCHEMICAL MODULE, ELECTROCHEMICAL DEVICE, ENERGY SYSTEM, SOLID OXIDE FUEL CELL, SOLID OXIDE ELECTROLYSIS CELL, AND METHOD FOR PRODUCING METAL SUPPORT

CROSS REFERENCE TO RELATED APPLICATIONS

This application is the United States national phase of International Application No. PCT/JP2021/014086 filed Mar. 31, 2021, and claims priority to Japanese Patent Application No. 2020-065257 filed Mar. 31, 2020, the disclosures of which are hereby incorporated by reference in their entirety.

BACKGROUND OF THE INVENTION

Field of the Invention

The present invention relates to a metal support that is formed in a plate shape as a whole and that has a plurality of through-holes penetrating from a front surface on which an electrode layer is provided to a back surface.

Description of Related Art

A known metal-supported solid oxide fuel cell (SOFC) is configured that a plurality of electrochemical elements are disposed in an assembled state, in which each of the electrochemical elements is configured to include an anode electrode layer, an electrolyte layer, and a cathode electrode layer, which are provided on a front surface of a metal support that is formed in a plate shape as a whole and that has a plurality of through-holes. In the metal-supported SOFC, optimization of a shape of each through-hole formed in the metal support has been studied in order to improve the power generation efficiency, improve the quality during mass production, reduce the cost, and the like (for example, see International Publication No. 2019-189913).

In such a known metal-supported SOFC, a gas flowing along the back surface of the metal support is supplied to and received from an electrode layer provided on the front surface of the metal support through the plurality of through-holes formed in the metal support. Therefore, in a case where a gas does not smoothly flow into or flow out from the through-holes penetrating from the front surface to the back surface of the metal support, for example, there were problems that a utilization rate of fuel gas decreases, and furthermore, an increase in the power generation efficiency of a SOFC system is difficult.

SUMMARY OF THE INVENTION

In view of the above described circumstance, an important objective of the present invention is to achieve a SOFC system by using a metal support mostly used for a metal-supported SOFC, which improves the power generation efficiency by allowing a gas to smoothly flow into or flow out from the through-holes.

A first feature configuration of a metal support according to the present invention is a metal support that is formed in a plate shape as a whole and that has a plurality of through-holes penetrating from a front surface on which an electrode layer is provided to a back surface, in which the metal support has inclined through-holes, as the through-holes, each of which has a central axis inclined with respect to a thickness direction.

According to this configuration, at least one of the plurality of the through-holes that are formed in the metal support through which a gas flowing along the back surface of the metal support is supplied to and received from the electrode layer provided on the front surface of the metal support is formed as the through-holes, each of which has a central axis inclined with respect to the thickness direction of the metal support. Here, the term "the gas is supplied to and received from the electrode layer" means that the gas is supplied to the electrode layer, and the gas is received from the electrode layer. Therefore, the central axis of the inclined through-hole can be inclined along a direction where the gas flows into the through-holes and a direction where the gas flows out from the through-holes on the front surface or the back surface of the metal support. Therefore, the gas can smoothly flow into or flow out from the inclined through-hole of the metal support. According to the configuration described above, the gas (for example, fuel gas or steam) can be smoothly supplied to the electrode layer of the electrochemical element, the gas (for example, steam in a case where the fuel gas is hydrogen, electrolyzed hydrogen, or the like in a case where the gas is the steam) can be smoothly discharged from the electrode layer of the electrochemical element, and the performance of the electrochemical element can be improved.

A second feature configuration of the metal support according to the present invention is that a gas flow channel through which a gas supplied to and received from the electrode layer flows is provided along the back surface of the metal support, and as each inclined through-hole, the metal support has a first inclined through-hole of which an opening on a front side of the metal support is positioned at further downstream of the gas flow channel in a gas flow direction than an opening on a back side of the metal support.

According to this configuration, in the gas flow channel provided along the back surface of the metal support, the gas can smoothly flow from the gas flow channel into the first inclined through-hole a change angle of a flow direction where the gas of which the flow direction is changed from the gas flow channel flows into the first inclined through-hole is as small as less than 90°. As a result, the gas can be more smoothly supplied from the gas flow channel to the electrode layer through the first inclined through-hole. The center line of each of the through-holes preferably has an inclination angle of less than 90° with respect to the horizontal plane on the back side of the metal support, more preferably has an inclination angle of 85° or less, and still more preferably has an inclination angle of 80° or less. In addition, in the plurality of through-holes, the center line of the through-holes preferably has an inclination angle of 45° or more with respect to the horizontal plane on the back side of the metal support so that the adjacent through-holes do not interfere with each other, and more preferably has an inclination angle of 50° or more, and still more preferably has an inclination angle of 55° or more. The above-mentioned first inclined through-hole may be one or may be plural.

A third feature configuration of the metal support according to the present invention is that a gas flow channel through which a gas supplied to and received from the electrode layer flows is provided along the back surface of the metal support, and as each inclined through-hole, the metal support has a second inclined through-hole of which an opening on a back side of the metal support is positioned at further downstream of the gas flow channel in a gas flow direction than an opening on a front side of the metal support.

According to this configuration, in the gas flow channel provided along the back surface of the metal support, the gas can smoothly flow from the second inclined through-hole to the gas flow channel since a change angle of a flow direction where the gas of which the flow direction is changed from the second inclined through-hole flows to the gas flow channel is as small as less than 90°. As a result, the gas can be more smoothly discharged from the electrode layer to the gas flow channel through the second inclined through-hole. The center line of each of the through-holes preferably has an inclination angle of less than 90° with respect to the horizontal plane on the front side of the metal support, more preferably has an inclination angle of 85° or less, and still more preferably has an inclination angle of 80° or less. In addition, in the plurality of through-holes, the center line of the through-holes preferably has an inclination angle of 45° or more with respect to the horizontal plane on the front side of the metal support so that the adjacent through-holes do not interfere with each other, and more preferably has an inclination angle of 50° or more, and still more preferably has an inclination angle of 55° or more. The above-mentioned second inclined through-hole may be one or may be plural.

A fourth feature configuration of the metal support according to the present invention is that a gas flow channel through which a gas supplied to and received from the electrode layer flows is provided along the back surface of the metal support, and the metal support has a first inclined through-hole and a second inclined through-hole as the inclined through-holes, the first inclined through-hole is inclined in a state in which an opening on a front side of the metal support is positioned at further downstream of the gas flow channel in a gas flow direction than an opening on a back side of the metal support, and the second inclined through-hole is inclined in a state in which an opening on the back side of the metal support is positioned at further downstream of the gas flow channel in the gas flow direction than an opening on the front side of the metal support.

According to this configuration, in the gas flow channel provided along the back surface of the metal support, the gas can smoothly flow from the gas flow channel into the first inclined through-hole a change angle of a flow direction where the gas of which the flow direction is changed from the gas flow channel flows into the first inclined through-hole is as small as less than 90°. As a result, the gas can be more smoothly supplied from the gas flow channel to the electrode layer through the first inclined through-hole.

In addition, in the gas flow channel provided along the back surface of the metal support, the gas can smoothly flow from the second inclined through-hole to the gas flow channel since a change angle of a flow direction where the gas of which the flow direction is changed from the second inclined through-hole flows to the gas flow channel is as small as less than 90°. As a result, the gas can be more smoothly discharged from the electrode layer to the gas flow channel through the second inclined through-hole.

A fifth feature configuration of the metal support according to the present invention is that each of the inclined through-holes is formed to have an opening area on the front side of the metal support smaller than an opening area on the back side of the metal support.

According to this configuration, processing and forming the inclined through-holes are easier, and the processability and cost during mass production can be improved, which is suitable.

A sixth feature configuration of the metal support according to the present invention is that the electrode layer includes an insertion section inserted into each of the inclined through-holes.

According to this configuration, in a case where paste of an electrode material is applied to the front surface of the metal support to form the electrode layer, a part of the paste enters into each of the inclined through-holes to an appropriate depth, and the paste entered thereinto is formed as the insertion section. Providing the insertion section formed to such an appropriate depth enables the electrode layer to be easily provided on the metal support, and enables the strength of the electrode layer to be improved.

A feature configuration of an electrochemical element according to the present invention is to include the metal support according to the present invention, and an electrode layer, an electrolyte layer, and a counter electrode layer are provided on the front surface of the metal support.

According to this configuration, since components of electrochemical elements such as an electrode layer, an electrolyte layer, and a counter electrode layer are formed on the metal support that can smoothly supply a gas to the electrode layer and that can smoothly discharge a gas from the electrode layer, the components of the electrochemical elements such as the electrode layer and other elements can be formed in a thin layer, or a thin film, the cost of materials for forming the electrochemical elements can be reduced, and the electrochemical elements with high-performance can be obtained.

Another feature configuration of the electrochemical element according to the present invention is to include a turbulence promoter that disturbs a flow in a gas flow channel provided in at least a part of the gas flow channel through which a gas is supplied to and received from the electrode layer flows.

According to this configuration, the turbulence promoter can be provided in at least a part of the gas flow channel to disturb a gas flow and to form a flow in a direction different from a main flow direction (for example, a flow orthogonal to the main flow) with respect to the main flow formed in the gas flow channel. As a result, the gas can be efficiently supplied to the electrode layer through the through-holes.

Still another feature configuration of the electrochemical element according to the present invention is to include a catalytic reaction section that reforms a fuel gas is provided in at least a part of the gas flow channel through which a gas supplied to and received from the electrode layer flows.

According to this configuration, the catalytic reaction section can be provided in at least a part of the gas flow channel to cause a catalytic reaction on the gas (the gas supplied to the electrode layer or the gas generated in the electrode layer) flowing through the gas flow channel. For example, in a case where a fuel gas such as methane or hydrogen is supplied to the electrode layer to make the electrochemical element serve as a fuel cell, the steam generated in the electrode layer and flowing to the gas flow channel through the through-holes can be effectively used and provided for reforming methane contained in the fuel gas (mainly steam-reforming).

Furthermore, in a case where at least a part of a surface of the above-mentioned turbulence promoter is used as the above-mentioned reforming reaction section, this turbulence promoter can cause a reforming reaction (steam-reforming in the above-mentioned example) in addition to the control of the gas flow in the gas flow channel by the turbulence promoter described above.

A feature configuration of the electrochemical module according to the present invention is that a plurality of the electrochemical elements according to the present invention are disposed in an assembled state.

According to this configuration, since the plurality of the metal supports described above, which can smoothly supply a gas to the electrode layer and can smoothly discharge a gas from the electrode layer, are disposed in an assembled state, the material cost and processing cost can be reduced, and the electrochemical module with high-performance, which is compact and is excellent in strength and reliability, can be obtained.

A feature configuration of an electrochemical device according to the present invention is to include the electrochemical element according to the present invention or the electrochemical module according to the present invention, and include a fuel converter that supplies a gas containing a reduction component to the electrochemical element or the electrochemical module, or a fuel converter that converts a gas containing a reduction component generated from the electrochemical element or the electrochemical module.

According to this configuration, the electrochemical device includes the electrochemical element or the electrochemical module, and the fuel converter that supplies a gas containing a reduction component to the electrochemical element or the electrochemical module, or the fuel converter that converts a gas containing a reduction component generated from the electrochemical element or the electrochemical module.

As a result, in a case where the electrochemical element or the electrochemical module is operated as a fuel cell, the electrochemical device provided with the electrochemical module with excellent durability, reliability, and performance can be achieved by adopting a configuration in which hydrogen is generated by the fuel converter such as a reformer from natural gas or the like supplied by using an existing raw fuel supply infrastructure such as a city gas, and supplied to the fuel cell. In addition, since a system for recycling the unused fuel gas discharged from the electrochemical module is likely to be constructed, a highly efficient electrochemical device can be obtained.

In a case where the electrochemical element or the electrochemical module is operated as an electrolysis cell, for example, the electrochemical element or the electrochemical module serves as an electrochemical device that converts hydrogen generated by an electrolysis reaction of water into methane through a reaction with carbon monoxide or carbon dioxide in the fuel converter, and with this configuration, the electrochemical device provided with the electrochemical module excellent in durability, reliability, and performance can be achieved.

Another feature configuration of the electrochemical device according to the present invention is to include the electrochemical element according to the present invention or the electrochemical module according to the present invention, and an electric power converter that extracts electric power from the electrochemical element or the electrochemical module or that supplies electric power to the electrochemical element or the electrochemical module.

According to this configuration, the electric power converter extracts electric power from the electrochemical element or the electrochemical module, or supplies electric power to the electrochemical element or the electrochemical module. As a result, as described above, the electrochemical element or the electrochemical module functions as a fuel cell or functions as an electrolysis cell. Therefore, according to the above configuration, it is possible to provide an electrochemical element or the like that can convert chemical energy such as fuel into electric energy or that can improve the efficiency of converting electric energy into chemical energy such as fuel.

For example, in a case where an inverter is used as the electric power converter, the inverter can boost an electrical output obtained from a high-performance electrochemical element or electrochemical module or can convert a direct current into an alternating current. Therefore, the electrical output obtained by the electrochemical element or the electrochemical module can be easily used, which is preferable.

A feature configuration of an energy system according to the present invention is to include the electrochemical device according to the present invention and an exhaust heat utilization section that reuses heat discharged from the electrochemical device.

According to this configuration, as a result of including the electrochemical device and the exhaust heat utilization section that reuses heat discharged from the electrochemical device, the energy system excellent in energy efficiency can be achieved. Moreover, a hybrid system having excellent energy efficiency can be achieved in combination with a power generation system which generates power by utilizing combustion heat of the unused fuel gas discharged from the electrochemical device.

A feature configuration of a solid oxide fuel cell or a solid oxide electrolysis cell according to the present invention is to include the electrochemical element according to the present invention and to cause a power generation reaction or an electrolysis reaction by using the electrochemical element.

According to this configuration, since a high-performance electrochemical element can be used as the solid oxide fuel cell to cause the power generation reaction, or a high-performance electrochemical element can be used as the solid oxide electrolysis cell to cause the electrolysis reaction, the solid oxide fuel cell excellent in the power generation efficiency and the solid oxide electrolysis cell excellent in the electrolysis efficiency can be obtained. For example, in a case where the solid oxide fuel cell can be operated in a temperature range of 650° C. or higher during the rated operation, it is possible to construct, in the fuel cell system in which a hydrocarbon-based gas such as a city gas is used as a raw fuel, a system in which heat required for converting a raw fuel into hydrogen can be substituted with exhaust heat of the fuel cell. As a result, the power generation efficiency of the fuel cell system can be increased, which is preferable. In addition, the solid oxide fuel cell that is operated in a temperature range of 900° C. or lower during the rated operation is more preferable since the effect of preventing Cr volatilization (diffusion) in a metal-supported electrochemical element is enhanced, and the solid oxide fuel cell that is operated in a temperature range of 850° C. or lower during the rated operation is still more preferable since the effect of preventing Cr volatilization is further enhanced.

DESCRIPTION OF THE INVENTION

Embodiments of the present invention will be described with reference to the drawings.

Figure 1:
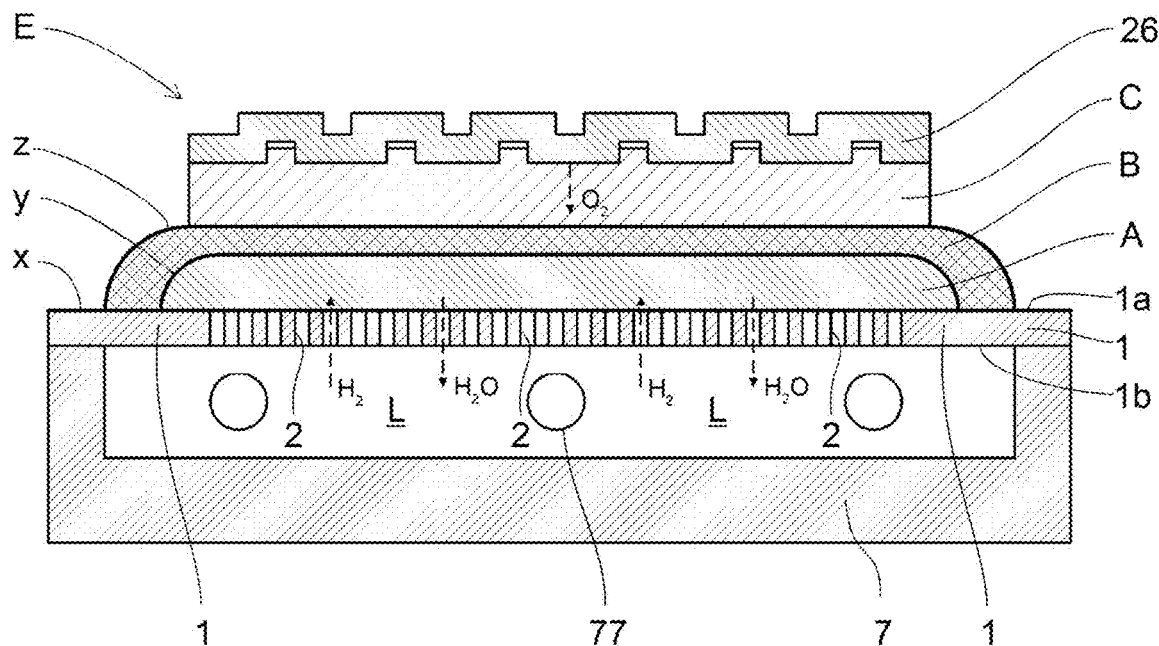
FIG. 1 is a cross-sectional view illustrating a configuration of an electrochemical element.
Figure 2:
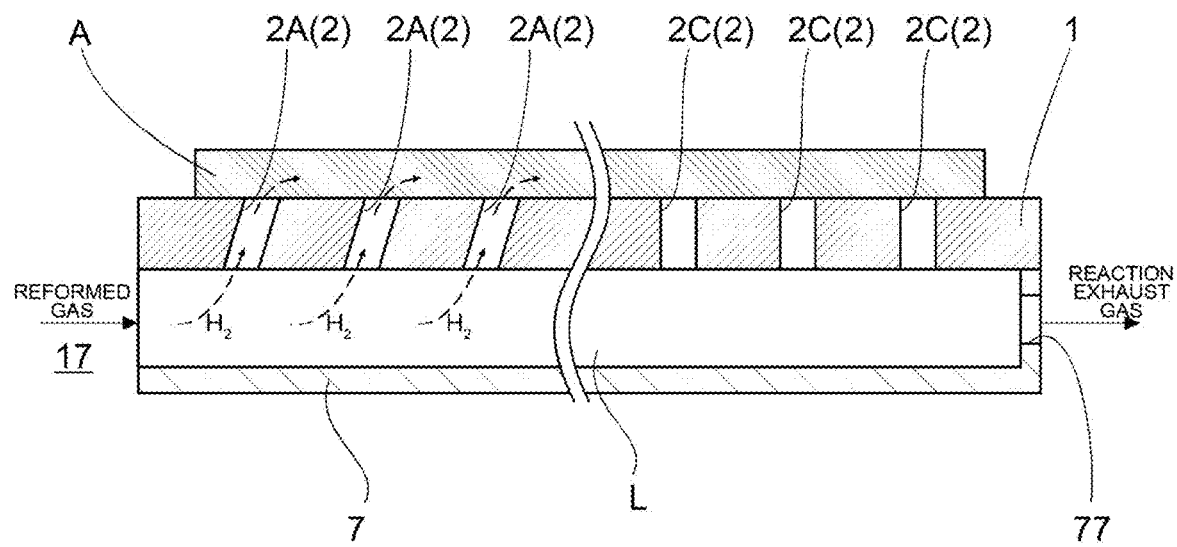
FIG. 2 is an enlarged cross-sectional view illustrating a shape and arrangement example of through-holes in a metal support.

An electrochemical element E illustrated in FIG. 1 is, for example, used as a fuel cell unit cell that is a component of a solid oxide fuel cell (hereinafter may be referred to as "SOFC") that receives a fuel gas containing hydrogen and air to perform power generation. Hereinafter, in a case of expressing a positional relationship of layers, for example, a cathode electrode layer C side is referred to as "upper" or an "upper side", and an anode electrode layer A side is referred to as "lower" or a "lower side", viewed from an electrolyte layer B. Moreover, a surface of a metal support 1 side on which the anode electrode layer A is formed is referred to as a front surface 1a, and a surface opposite to the metal support 1 side on which the anode electrode layer A is formed is referred to as a back surface 1b.

Moreover, the anode electrode layer A may be simply referred to as an "electrode layer", and the cathode electrode layer C may be referred to as a "counter electrode layer".

(Electrochemical Element E)

As illustrated in FIG. 1, the electrochemical element E includes the metal support 1, the anode electrode layer A formed on the metal support 1, an interlayer y formed on the anode electrode layer A, and the electrolyte layer B formed on the interlayer y. The electrochemical element E further includes a reaction preventing layer z formed on the electrolyte layer B and the cathode electrode layer C formed on the reaction preventing layer z. That is, the cathode electrode layer C is formed on the electrolyte layer B, and the reaction preventing layer z is formed between the electrolyte layer B and the cathode electrode layer C. The anode electrode layer A is porous, and the electrolyte layer B is dense.

In the electrochemical element E, a U-shaped member 7 is attached to the back surface 1b of the metal support 1, and the metal support 1 and the U-shaped member 7 form a tubular support. A space surrounded by the metal support 1 and the U-shaped member 7 is a gas flow channel L to which a reformed gas is supplied from a gas manifold 17.

End portions on one side (upper end side in FIG. 14) of the gas flow channel L are closed by a lid portion 74. The lid portion 74 is provided with an exhaust gas discharge port 77 through which a reaction exhaust gas flowing through the gas flow channel L is discharged to the outside (a combustion section 36 in FIG. 14). An opposite side to the end portions where the lid portion 74 is provided (the lower end side in FIG. 14) is opened to the gas manifold 17, and serves as an inlet through which the reformed gas flows into the gas flow channel L.

Figure 13:
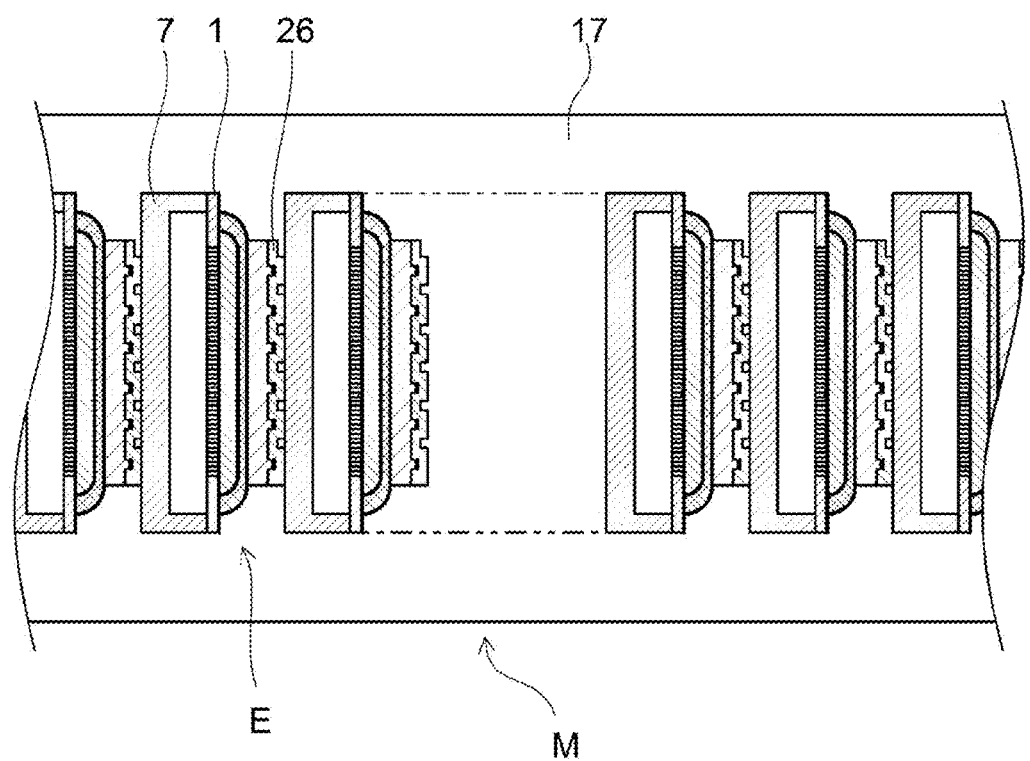
FIG. 13 is a schematic diagram illustrating a configuration of the electrochemical elements and an electrochemical module.

A plurality of the electrochemical elements E are stacked (the electrochemical elements E are disposed in an assembled state) so that a current-collecting member 26 is interposed therebetween to form an electrochemical module M (see FIG. 13). The current-collecting member 26 is bonded to the cathode electrode layer C and the U-shaped member 7 in each electrochemical element E, and electrically connects both the cathode electrode layer C and the U-shaped member 7 to each other. A configuration in which the current-collecting member 26 is not provided, and the cathode electrode layer C and the U-shaped member 7 in the electrochemical element E are directly electrically connected may be adopted.

(Metal Support 1)

The metal support 1 supports the anode electrode layer A, the interlayer y, the electrolyte layer B, and other layers to secure the strength of the electrochemical element E. That is, the metal support 1 has a role as a support that supports the electrochemical element E.

As a material for the metal support 1, a material having excellent electron conductivity, heat resistance, oxidation resistance, and corrosion resistance is used. For example, ferritic stainless steel, austenitic stainless, a nickel-based alloy, or another substance is used. In particular, an alloy containing chromium is suitably used. In the present embodiment, a Fe—Cr-based alloy containing 18% by mass to 25% by mass of Cr is used for the metal support 1, but a Fe-Cr-based alloy containing 0.05% by mass or greater of Mn, a Fe—Cr-based alloy containing 0.15% by mass to 1.0% by mass of Ti, a Fe—Cr-based alloy containing 0.15% by mass to 1.0% by mass of Zr, a Fe—Cr-based alloy containing Ti and Zr and having a total content of Ti and Zr of 0.15% by mass to 1.0% by mass, and a Fe—Cr-based alloy containing 0.10% by mass to 1.0% by mass of Cu are particularly suitable.

The metal support 1 is formed in a plate shape as a whole. Moreover, the metal support 1 has a surface on which the anode electrode layer A is provided as the front surface 1a, and is provided with the plurality of through-holes 2 penetrating from the front surface 1a to the back surface 1b. These through-holes 2 have a function of allowing a gas to permeate from the back surface 1b to the front surface 1a of the metal support 1. Furthermore, the plate-shaped metal support 1 can also be bent to deform in a shape such as a box shape and a cylindrical shape, for example.

A diffusion preventing layer x made of a metal oxide is provided on a surface of the metal support 1. That is, the diffusion preventing layer x is formed between the metal support 1 and the anode electrode layer A described later. The diffusion preventing layer x is provided not only on the surface of the metal support 1 that is exposed to the outside but also on a contact surface (interface) with the anode electrode layer A. Moreover, the diffusion preventing layer x can also be provided on an inner surface of each of the through-holes 2. Element interdiffusion between the metal support 1 and the anode electrode layer A can be prevented by this diffusion preventing layer x. For example, in a case where ferritic stainless containing chromium is used for the metal support 1, the diffusion preventing layer x is mostly composed of a chromium oxide. In addition, diffusion of chromium atoms or other substances of the metal support 1 into the anode electrode layer A or the electrolyte layer B is prevented by the diffusion preventing layer x that is composed of a chromium oxide as a main component. A thickness of the diffusion preventing layer x may be any thickness as long as both high diffusion preventing performance and low electric resistance are achieved.

The diffusion preventing layer x can be formed by various methods, but a method for oxidizing the surface of the metal support 1 to form a metal oxide is suitably utilized. Moreover, the diffusion preventing layer x may be formed on the surface of the metal support 1 by a spray coating method (a method such as a thermal spraying method, an aerosol deposition method, an aerosol gas deposition method, a powder jet deposition method, a particle jet deposition method, and a cold spraying method), a PVD method such as a sputtering method and a PLD method, a CVD method, or another method, and may be formed by plating and an oxidation treatment. Furthermore, the diffusion preventing layer x may contain a spinel phase having high conductivity.

In a case where a ferrite stainless steel material is used for the metal support 1, a thermal expansion coefficient of the metal support 1 is close to that of yttria-stabilized zirconia (YSZ) or gadolinium-doped ceria (GDC, also referred to as CGO) used as a material for the anode electrode layer A or the electrolyte layer B. Therefore, even in a case where a temperature cycle of a low temperature and a high temperature is repeated, the electrochemical element E is less likely to be damaged. Accordingly, an electrochemical element E having excellent long-term durability can be obtained, which is preferable.

(Structure of Metal Support 1 and Through-Hole 2)

As illustrated in FIG. 1, the metal support 1 is one metal plate, and a plurality of through-holes 2 that penetrate from the front surface 1a on which the anode electrode layer A is provided to the back surface 1b are provided in the metal support 1.

Each of the through-holes 2 is a hole having a circular cross section. The cross-sectional shape of each of the through-holes 2 can be circular, substantially circular, rectangular, triangular, polygonal, or another shape, and various shapes can be adopted as long as the through-holes 2 can be formed within a range in which a function as the metal support 1 can be maintained. These through-holes 2 are formed in the metal support 1 by any of laser processing, punching processing, or etching processing, or a combination thereof. A central axis of each hole is orthogonal to the metal support 1.

FIGS. 2 to 11 illustrate examples regarding shapes and arrangements of the through-holes 2 that enable a gas to be smoothly supplied from and discharged to the anode electrode layer A through the through-holes 2 to improve the performance of the electrochemical element E.

As illustrated in each of these examples, the metal support 1 includes, as the through-holes 2, first inclined through-holes 2A and 2At, second inclined through-holes 2B and 2Bt each of which has a central axis inclined with respect to a thickness direction, and parallel through-holes 2C each of which has a central axis parallel to the thickness direction.

In FIGS. 2 to 11, the cross-sectional state of the metal support 1 and the gas flow channel L is illustrated such that a lower end portion on the gas manifold 17 side is the left side, an upper end portion on the combustion section 36 side is the right side, a gas flow direction F in the gas flow channel L is illustrated as a direction in which a gas flows from the left side toward the right side.

The first inclined through-holes 2A and 2At (see FIGS. 2, and 5 to 11) are through-holes 2 inclined in a state in which an opening of one through-hole on the front side of the metal support 1 is positioned on further downstream in the gas flow direction F than an opening of the one through-hole on the back side, to be inclined. On the other hand, the second inclined through-holes 2B and 2Bt (see FIGS. 3, 4, and 6 to 11) are through-holes 2 inclined in a state in which an opening of one through-hole on the front side of the metal support 1 is positioned on further upstream than an opening of the one through-hole on the back side in the gas flow direction F.

That is, since the first inclined through-holes 2A and 2At are provided in the metal support 1, a change angle of a flow direction where a reformed gas ($H_2$) of which the flow direction is changed from the gas flow channel L flows into the first inclined through-holes 2A and 2At is as small as less than 90°. Therefore, the reformed gas smoothly flows from the gas flow channel L into the first inclined through-holes 2A and 2At.

On the other hand, by providing the second inclined through-holes 2B and 2Bt in the metal support 1, steam in the gas flow channel L can smoothly flow from the second inclined through-holes 2B and 2Bt to the gas flow channel L since a change angle of a flow direction where the steam ($H_2O$) of which the flow direction is changed from the second inclined through-holes 2B and 2Bt flows to the gas flow channel L is as small as less than 90°.

Furthermore, in the arrangement examples illustrated in FIGS. 6 to 8, 10, and 11, the first inclined through-holes 2A and 2At are positioned on the upstream of the gas flow channel L, and the second inclined through-holes 2B and 2Bt are positioned on the downstream thereof, along the gas flow direction F. By adopting this configuration, supplying the reformed gas ($H_2$) from the gas flow channel L to the anode electrode layer A through the first inclined through-holes 2A and 2At, and discharging the steam ($H_2O$) from the anode electrode layer A to the gas flow channel L through the second inclined through-holes 2B and 2Bt are smoothly performed along the gas flow direction F in the gas flow channel L. Moreover, the central axes of the first inclined through-holes 2A and 2At and the central axes of the second inclined through-holes 2B and 2Bt intersect or are close to each other on the front side (upper side in the drawing) of the metal support 1. Therefore, a light source such as a laser beam for processing the through-holes 2 can be disposed with reference to an intersecting or adjacent portion.

In the arrangement examples illustrated in FIGS. 6, 8, 10, and 11, the metal support 1 is divided into an upstream region and a downstream region along the gas flow direction F, a plurality of the first inclined through-holes 2A and 2At are disposed on the upstream, and a plurality of the second inclined through-holes 2B and 2Bt are disposed on the downstream. Moreover, in the arrangement examples illustrated in FIGS. 8, 10, and 11, a parallel through-hole 2C is appropriately disposed in a region between one first inclined through-hole 2A and one second inclined through-hole 2B.

Figure 7:
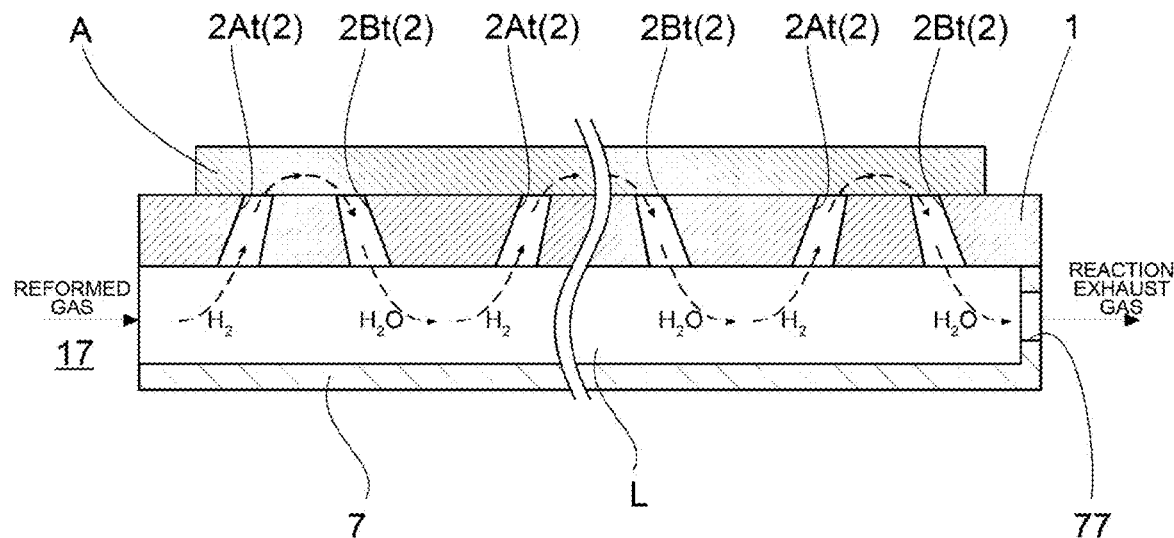
FIG. 7 is an enlarged cross-sectional view illustrating a shape and arrangement example of through-holes in the metal support.

On the other hand, in the arrangement example illustrated in FIG. 7, a plurality of a pair of inclined through-holes 2At and 2Bt composed of one first inclined through-hole 2At and one second inclined through-hole 2Bt positioned on the immediately downstream thereof are disposed along the gas flow direction F.

Each of the first inclined through-holes 2A and second inclined through-holes 2B illustrated in the arrangement examples of FIGS. 2 to 5 and 8 to 11 has a shape in which a diameter thereof does not change along the central axis. By contrast, each of the first inclined through-holes 2At and second inclined through-holes 2Bt illustrated in the arrangement examples of FIGS. 6 and 7 has an opening area on the front surface 1a smaller than an opening area on the back surface 1b in the metal support 1, and specifically, each of the first inclined through-holes 2At and second inclined through-holes 2Bt in the metal support 1 has a tapered shape in which a diameter of each through-hole is gradually increased from the front surface 1a toward the back surface 1b. By adopting this configuration, processing and forming the inclined through-holes 2A and 2B with a laser beam emitted from the light source on the front side of the metal support 1 are more easily carried out.

Figure 12:
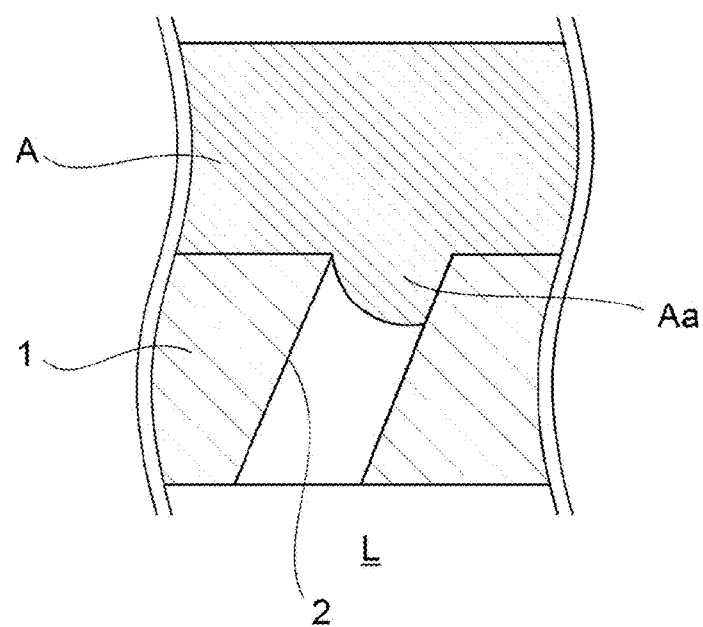
FIG. 12 is an enlarged cross-sectional view illustrating a part of a through-hole in the electrochemical element.

Moreover, as illustrated in FIG. 12, the anode electrode layer A has an insertion section Aa inserted into the inclined through-holes 2 described above. That is, although the details will be described later, in a case where paste of an anode electrode material is applied to the front surface 1a of the metal support 1 to form the anode electrode layer A, a part of the paste enters the inclined through-hole 2 to an appropriate depth. Then, the paste that has entered the inclined through-hole 2 is formed as the insertion section Aa. By providing the insertion section Aa with such an appropriate depth, the anode electrode layer A is easily formed on the metal support 1, and the strength of the anode electrode layer A is improved.

(Structure in Gas Flow Channel L)

In the examples illustrated in FIGS. 8 to 11, a turbulence promoter 80 that disturbs a flow in the gas flow channel L is provided in the gas flow channel L. By adopting this configuration, the reformed gas flow in the gas flow channel L is disturbed, and a flow is formed in a direction different from a main flow direction (for example, a flow orthogonal to the main flow) with respect to a main flow formed in the gas flow channel L. As a result, the reformed gas is efficiently supplied to the electrode layer A through the through-holes 2. Although the example in which the gas flow channel L is filled with a plurality of spheres to form the turbulence promoter 80, a shape or the like of the turbulence promoter can be appropriately modified by, for example, disposing a net-like body in the gas flow channel L to form a turbulence promoter.

Figure 8:
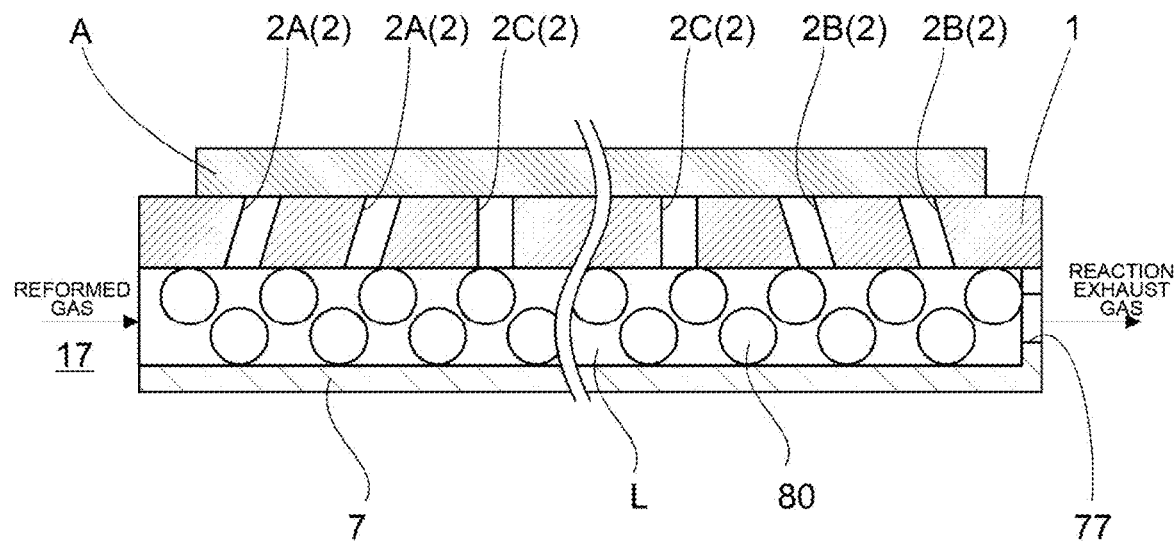
FIG. 8 is an enlarged cross-sectional view illustrating a shape and arrangement example of through-holes in the metal support.
Figure 9:
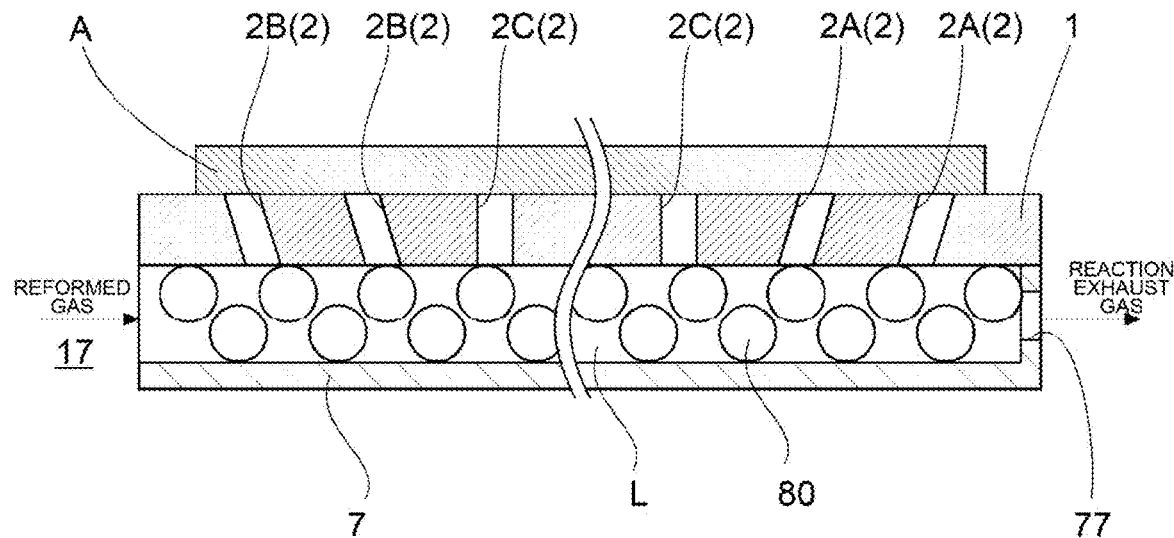
FIG. 9 is an enlarged cross-sectional view illustrating a shape and arrangement example of through-holes in the metal support.
Figure 10:
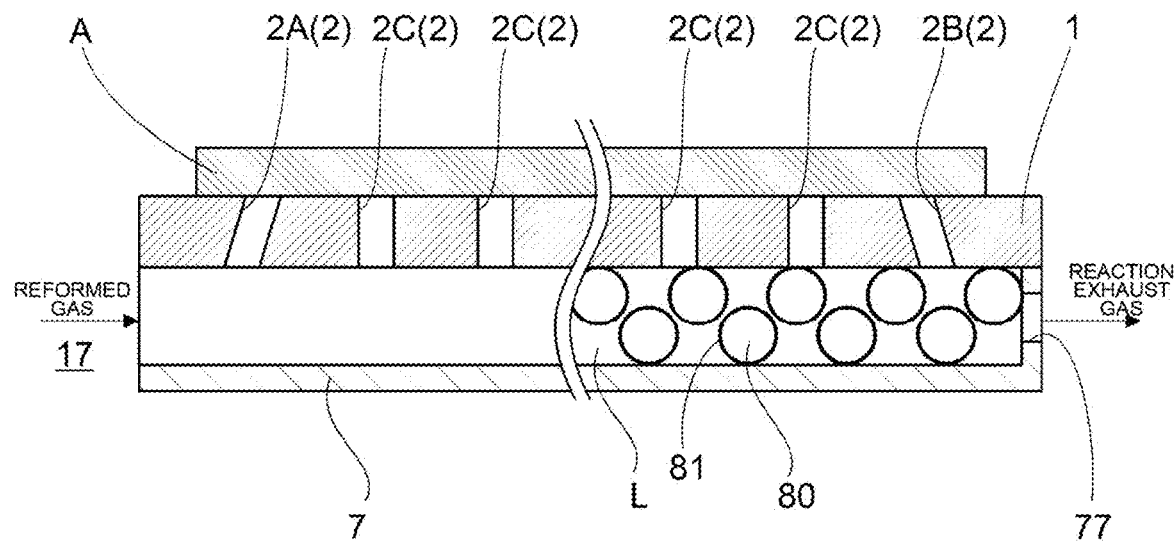
FIG. 10 is an enlarged cross-sectional view illustrating a shape and arrangement example of through-holes in the metal support.
Figure 11:
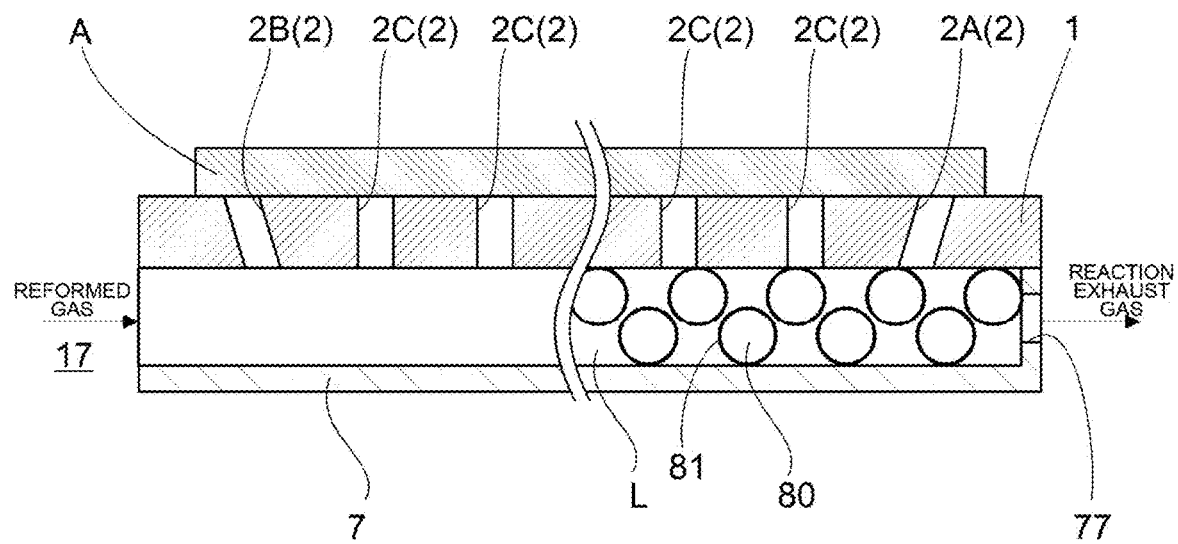
FIG. 11 is an enlarged cross-sectional view illustrating a shape and arrangement example of through-holes in the metal support.

Moreover, the turbulence promoter 80 in the gas flow channel L can be appropriately disposed within a range of disposing the turbulence promoter 80 in the entire gas flow channel L as illustrated in the examples of FIGS. 8 and 9 or disposing the turbulence promoter 80 in a part of the gas flow channel L (for example, a downstream region) as illustrated in the examples of FIGS. 10 and 11.

Furthermore, in the examples illustrated in FIGS. 9 and 10, a catalytic reaction section 81 that reforms the fuel gas flowing the gas flow channel L into hydrogen is provided in the gas flow channel L, and specifically, the catalytic reaction section 81 is provided on at least a part of a surface of the turbulence promoter 80. For example, a catalytic layer in which ruthenium is supported as an active metal on a metal oxide carrier is provided on the surface of the turbulence promoter 80 as a catalytic reaction section 81. In this way, in a case where the electrochemical element E is operated as a fuel cell, a fuel gas to be reformed (pre-reform gas: specifically, reduction gas containing methane as the main component) may flow in the gas flow channel L in addition to hydrogen obtained by external reforming. Then, the steam generated in the anode electrode layer A returns to the gas flow channel L; thereby, the fuel gas flowing into the gas flow channel L in the catalytic reaction section 81 can be steam-reformed. Needless to say, the produced hydrogen or carbon monoxide can be supplied to an anode electrode layer A through through-holes 2 on downstream, and can be provided for power generation.

(Anode Electrode Layer A)

As illustrated in FIG. 1, the anode electrode layer A can be provided as a thin layer in a region which is on the front surface 1a of the metal support 1 and is larger than a region where the plurality of through-holes 2 are provided. In a case of being provided as a thin layer, a thickness thereof can be, for example, about 1 µm to 100 µm and preferably 5 µm to 50 µm. In a case where the thickness is set as described above, a sufficient electrode performance can be ensured while reducing a cost by reducing a used amount of an expensive material for the anode electrode layer. The entire region where the plurality of through-holes 2 are provided is covered with the anode electrode layer A. That is, the plurality of through-holes 2 are formed in a region of the metal support 1 where the anode electrode layer A is formed. In other words, all the through-holes 2 are provided to face the anode electrode layer A.

As a material for the anode electrode layer A, for example, a composite material such as NiO-GDC, Ni-GDC, NiO-YSZ, Ni-YSZ, $CuO-CeO_2$, and $Cu-CeO_2$ can be used. In these examples, GDC, YSZ, and $CeO_2$ can be referred to as a composite aggregate. In addition, the anode electrode layer A is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. By adopting these processes that can be used in a low-temperature range, a favorable anode electrode layer A can be obtained without using calcination in a high-temperature range of higher than 1,100° C., for example. For the reason, the element interdiffusion between the metal support 1 and the anode electrode layer A can be prevented without damaging the metal support 1, and an electrochemical element E having excellent durability can be obtained, which is preferable. Furthermore, using the low-temperature calcination method is more preferable because handling of raw materials becomes easy.

The anode electrode layer A has a plurality of pores inside and on the surface thereof to have gas permeability.

That is, the anode electrode layer A is formed as a porous layer. The anode electrode layer A is formed, for example, so that the denseness is 30% or greater and smaller than 80%. As a size of the pore, a size suitable for allowing an electrochemical reaction to smoothly proceed during the reaction can be appropriately selected. Moreover, the denseness is a proportion of a material constituting a layer to a space, can be expressed as (1 -porosity), and is equivalent to a relative density.

(Interlayer y)

As illustrated in FIG. 1, the interlayer y (insertion layer) can be formed as a thin layer on the anode electrode layer A to cover the anode electrode layer A. In a case of being provided as a thin layer, a thickness thereof can be, for example, about 1 µm to 100 µm, preferably about 2 µm to 50 µm, and more preferably about 4 µm to 25 µm. In a case where the thickness is set as described above, a sufficient performance can be ensured while reducing a cost by reducing a used amount of an expensive material for the interlayer. As a material for the interlayer y, for example, yttria-stabilized zirconia (YSZ), scandium-stabilized zirconia (SSZ), gadolinium-doped ceria (GDC), yttrium-doped ceria (YDC), samarium-doped ceria (SDC), or the like can be used. In particular, ceria-based ceramics are suitably used.

The interlayer y is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. By adopting these film formation processes that can be used in a low-temperature range, the interlayer y can be obtained without using calcination in a high-temperature range of higher than 1,100° C., for example. For the reason, the element interdiffusion between the metal support 1 and the anode electrode layer A can be prevented without damaging the metal support 1, and an electrochemical element E having excellent durability can be obtained. Furthermore, using a low-temperature calcination method is still more preferable since handling of raw materials is easy.

The interlayer y preferably has oxygen ion (oxide ion) conductivity. In addition, the interlayer 3 more preferably has mixed conductivity of an oxygen ion (oxide ion) and an electron. The interlayer y having these properties is suitable for application to the electrochemical element E.

(Electrolyte Layer B)

The electrolyte layer B is formed as a thin layer on the interlayer y to cover the anode electrode layer A and the interlayer y, as illustrated in FIG. 1. The electrolyte layer B can also be formed as a thin film having a thickness of 10 µm or smaller. Specifically, as illustrated in FIG. 1, the electrolyte layer B is provided over (provided on both) the interlayer y and the metal support 1. With such a configuration, the electrolyte layer B is bonded to the metal support 1; thereby the electrochemical element as a whole can have excellent fastness properties.

As illustrated in FIG. 1, the electrolyte layer B is provided in a region that is on the front surface 1a of the metal support 1 and that is larger than a region where the plurality of through-holes 2 are provided. That is, the plurality of through-holes 2 is formed in a region of the metal support 1 where the electrolyte layer B is formed.

At the periphery of the electrolyte layer B, gas leakage from the anode electrode layer A and the interlayer y can be prevented. To explain, in a case where the electrochemical element E is used as a fuel cell unit cell of SOFC, gas is supplied from the back side of the metal support 1 to the anode electrode layer A through the through-holes 2 during the operation of SOFC. At a site where the electrolyte layer B is in contact with the metal support 1, gas leakage can be prevented without providing a separate member such as a gasket. Moreover, although the electrolyte layer B covers the entire periphery of the anode electrode layer A in the present embodiment, a configuration in which the electrolyte layer B is provided on an upper portion of the anode electrode layer A and the interlayer y, and a gasket or the like is provided at the periphery may be adopted.

As a material for the electrolyte layer B, electrolyte materials that conduct oxygen ions such as yttria-stabilized zirconia (YSZ), scandium-stabilized zirconia (SSZ), gadolinium-doped ceria (GDC), yttrium-doped ceria (YDC), samarium-doped ceria (SDC), and strontium-and magnesium-doped lanthanum gallate (LSGM), or electrolyte materials that conduct hydrogen ions such as perovskite-type oxides can be used. In particular, zirconia-based ceramics are suitably used. In a case where the electrolyte layer B is made of the zirconia-based ceramics, an operating temperature of SOFC using the electrochemical element E can be made higher than that in a case of ceria-based ceramics or various hydrogen ion conductive materials. For example, the electrochemical element E is used as SOFC, and a system configuration in which a material, such as YSZ, which can exhibit a high electrolyte performance even in a high-temperature range of about 650° C. or higher is used as the material for the electrolyte layer B, a hydrocarbon-based raw fuel such as a city gas and LPG is used as a raw fuel of the system, and the raw fuel is steam-reformed to become an anode gas of SOFC is adopted, it is possible to construct a highly efficient SOFC system in which heat generated in a cell stack of SOFC is used for reforming the raw fuel gas.

The electrolyte layer B is preferably formed by a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. As a result of adopting these film formation processes that can be used in a low-temperature range, an electrolyte layer B that is dense and that has high gastightness and gas barrier properties can be obtained without using calcination in a high-temperature range of higher than 1,100° C., for example. For the reason, the damage of the metal support 1 can be prevented, the element interdiffusion between the metal support 1 and the anode electrode layer A can be prevented, and the electrochemical element E excellent in performance and durability can be obtained. In particular, using a low-temperature calcination method, a spray coating method, or the like is preferable because a low-cost element can be obtained. Furthermore, using the spray coating method is more preferable because the electrolyte layer B that is dense and that has high gastightness and gas barrier properties can be easily obtained in a low-temperature range.

The electrolyte layer B is densely configured to shield gas leak of an anode gas and a cathode gas and to exhibit high ionic conductivity. A denseness of the electrolyte layer B is preferably 90% or greater, more preferably 95% or greater, and still more preferably 98% or greater. When the electrolyte layer B is a uniform layer, the denseness thereof is preferably 95% or greater and more preferably 98% or greater. Moreover, when the electrolyte layer B is formed in a form of a plurality of layers, at least some of these layers preferably include a layer (a dense electrolyte layer) having a denseness of 98% or greater, and more preferably include a layer (a dense electrolyte layer) having a denseness of 99% or greater. This is because when such a dense electrolyte layer is included in a part of the electrolyte layer, the electrolyte layer that is dense and that has high gastightness and gas barrier properties can be easily formed even in a case where the electrolyte layer is formed in a form of a plurality of layers.

(Reaction Preventing Layer z)

The reaction preventing layer z can be formed as a thin layer on the electrolyte layer B. In a case where the reaction preventing layer z is provided as a thin layer, a thickness thereof can be, for example, about 1 µm to 100 µm, preferably about 2 µm to 50 µm, and more preferably about 3 µm to 15 µm. In a case where the thickness is set as described above, a sufficient performance can be ensured while reducing a cost by reducing a used amount of an expensive material for the reaction preventing layer. A material for the reaction preventing layer z may be any material as long as the material can prevent a reaction between the components of the electrolyte layer B and the components of the cathode electrode layer C, but for example, a ceria-based material or the like is used. Moreover, as the material for the reaction preventing layer z, a material containing at least one element selected from the group consisting of Sm, Gd, and Y is suitably used. Furthermore, the material may contain at least one element selected from the group consisting of Sm, Gd, and Y, and a total content ratio of these elements may be 1.0% by mass to 10% by mass. By introducing the reaction preventing layer z between the electrolyte layer B and the cathode electrode layer C, a reaction between the constituent materials of the cathode electrode layer C and the constituent materials of the electrolyte layer B can be effectively suppressed, and long-term stability of the performance of the electrochemical element E can be improved. Forming the reaction preventing layer z by appropriately using a method in which the reaction preventing layer z can be formed at a treatment temperature of 1,100° C. or lower is preferable because the damage of the metal support 1 can be prevented, the element interdiffusion between the metal support 1 and the anode electrode layer A can be prevented, and the electrochemical element E excellent in a performance and durability can be obtained. For example, the formation can be performed by appropriately using a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. In particular, using a low-temperature calcination method, a spray coating method, or the like is preferable because a low-cost element can be obtained. Furthermore, using the low-temperature calcination method is more preferable because handling of raw materials becomes easy.

(Cathode Electrode Layer C)

The cathode electrode layer C can be formed as a thin layer on the electrolyte layer B or the reaction preventing layer z. In a case of being provided as a thin layer, a thickness thereof can be, for example, about 1 µm to 100 µm and preferably 5 µm to 50 µm. When the thickness is set as described above, a sufficient electrode performance can be ensured while reducing a cost by reducing a used amount of an expensive material for the cathode electrode layer C. As a material for the cathode electrode layer C, for example, a composite oxide such as LSCF and LSM, a ceria-based oxide, and a mixture thereof can be used. In particular, the cathode electrode layer C preferably contains a perovskite-type oxide containing two or more elements selected from the group consisting of La, Sr, Sm, Mn, Co, and Fe. The cathode electrode layer C formed of the above materials functions as a cathode.

In addition, forming the cathode electrode layer C by appropriately using a method in which the cathode electrode layer C can be formed at a treatment temperature of 1,100° C. or lower is preferable because the damage of the metal support 1 can be prevented, the element interdiffusion between the metal support 1 and the anode electrode layer A can be prevented, and the electrochemical element E excellent in performance and durability can be obtained. For example, the cathode electrode layer C can be formed by appropriately using a low-temperature calcination method (for example, a wet method using a calcination treatment in a low-temperature range without performing a calcination treatment in a high-temperature range of higher than 1,100° C.), a spray coating method (a method such as a thermal spraying method, an aerosol deposition method, an aerosol gas deposition method, a powder jet deposition method, a particle jet deposition method, and a cold spraying method), a PDV method (a sputtering method, a pulsed laser deposition method, or the like), a CVD method, or the like. In particular, using a low-temperature calcination method, a spray coating method, or the like is preferable because a low-cost element can be obtained. Furthermore, using the low-temperature calcination method is more preferable because handling of raw materials becomes easy.

(SOFC)

As a result of forming the electrochemical element E as described above, the electrochemical element E can be used as a SOFC single cell in a case where this electrochemical element E functions as the fuel cell unit cell. For example, a fuel gas containing hydrogen is supplied to the anode electrode layer A from the back surface $1b$ of the metal support 1 through the plurality of through-holes 2, and air is supplied to the cathode electrode layer C serving as a counter electrode of the anode electrode layer A to operate the electrochemical element E at a temperature of, for example, 500° C. or higher and 900° C. or lower. Then, oxygen $O_2$ contained in the air in the cathode electrode layer C reacts with electrons $e^-$ to generate oxygen ions $O^{2-}$. The oxygen ions $O^{2-}$ move to the anode electrode layer A through the electrolyte layer B. In the anode electrode layer A, hydrogen $H_2$ contained in the supplied fuel gas reacts with the oxygen ions $O^{2-}$ to generate water $H_2O$ (steam) and electrons $e^-$.

In a case where an electrolyte material that conducts hydrogen ions is used for the electrolyte layer B, hydrogen $H_2$ contained in the fuel gas supplied to the anode electrode layer A emits electrons $e^-$ to generate hydrogen ions $H^+$. The hydrogen ions $H^+$ move to the cathode electrode layer C through the electrolyte layer B. In the cathode electrode layer C, Oxygen $O_2$ contained in air, reacts with hydrogen ions $H^+$ and electrons $e^-$ to generate water $H_2O$.

The above reaction causes an electromotive force to be generated between the anode electrode layer A and the cathode electrode layer C. In this case, the anode electrode layer A functions as a fuel electrode (anode) of SOFC, and the cathode electrode layer C functions as an air electrode (cathode).

(Method for Producing Electrochemical Element E)

Next, a method for producing the electrochemical element E will be described.

(Anode Electrode Layer Forming Step)

In an anode electrode layer forming step, the anode electrode layer A is formed as a thin film in a region wider than a region where the plurality of through-holes 2 are provided on the front surface 1a of the metal support 1. The plurality of through-holes 2 can be formed in the metal support 1 by laser processing or the like. The anode electrode layer A can be formed by appropriately using a low-temperature calcination method (a wet method with a calcination treatment in a low-temperature range of 1,100° C. or lower), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. Regardless of which method is used, it is desirable to carry out a method at a temperature of 1,100° C. or lower in order to prevent deterioration of the metal support 1.

In a case where the anode electrode layer forming step is carried out by the low-temperature calcination method, specifically the anode electrode layer forming step is carried out according to the following example. First, material powder of the anode electrode layer A and a solvent (dispersion medium) are mixed to prepare material paste, and the material paste is applied to the front surface 1a of the metal support 1. Then, the anode electrode layer A is compression molded (anode electrode layer smoothing step) and is calcinated at 1,100° C. or lower (anode electrode layer calcination step). The compression molding of the anode electrode layer A can be carried out by, for example, cold isostatic pressing (CIP, cold hydrostatic pressure) molding, roll pressure molding, rubber isostatic pressing (RIP) molding, or the like. The anode electrode layer A is suitably calcinated at a temperature of 800° C. or higher and 1,100° C. or lower. The order of the anode electrode layer smoothing step and the anode electrode layer calcination step can be exchanged.

In a case of forming the electrochemical element E including the interlayer y, the anode electrode layer smoothing step or the anode electrode layer calcination step is not carried out, or the anode electrode layer smoothing step or the anode electrode layer calcination step can also be included in an interlayer smoothing step or an interlayer calcination step described later.

The anode electrode layer smoothing step can also be carried out by performing a lap forming or leveling treatment, a surface cutting and polishing treatment, or the like.

Moreover, in the compression molding of the anode electrode layer A described above, a part of the material paste applied to the front surface 1a of the metal support 1 enters the through-holes 2 formed in the metal support 1 to an appropriate depth, and the portion where the material paste has entered is the above-mentioned insertion section Aa (see FIG. 12).

(Diffusion Preventing Layer Forming Step)

The diffusion preventing layer x is formed on the surface of the metal support 1 during the calcination step in the above-mentioned anode electrode layer forming step. In a case where the above-mentioned calcination step includes a calcination step carried out based on a condition of setting a calcination atmosphere to an atmosphere with a low oxygen partial pressure, the effect of preventing mutual diffusion of elements is high, and a high-quality diffusion preventing layer x having a low resistance value is formed, which is preferable. Including a case where the anode electrode layer forming step is carried out by a coating method without calcination, another diffusion preventing layer forming step may be included. In both case, it is desirable to carry out the treatment at a treatment temperature of 1,100° C. or lower, which can prevent damage to the metal support 1. In addition, the diffusion preventing layer x may be formed on the surface of the metal support 1 during the calcination step in an interlayer forming step described later.

(Interlayer Forming Step)

In an interlayer forming step, the interlayer y is formed as a thin layer on the anode electrode layer A to cover the anode electrode layer A. The interlayer y can be formed by appropriately using a low-temperature calcination method (a wet method with a calcination treatment in a low-temperature range of 1,100° C. or lower), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. Regardless of which method is used, it is desirable to carry out a method at a temperature of 1,100° C. or lower in order to prevent deterioration of the metal support 1.

In a case where the interlayer forming step is carried out by the low-temperature calcination method, it is specifically performed as in the following example.

First, material powder of the interlayer y and a solvent (dispersion medium) are mixed to prepare material paste, and the material paste is applied to the front surface 1a of the metal support 1. Then, the interlayer y is compression molded (interlayer smoothing step) and calcinated at 1,100° C. or lower (interlayer calcination step). The compression molding of the interlayer y can be carried out by, for example, cold isostatic pressing (CIP, cold hydrostatic pressure) molding, roll pressure molding, rubber isostatic pressing (RIP) molding, or the like. The interlayer y is suitably calcinated at a temperature of 800° C. or higher and 1,100° C. or lower. The reason why such a temperature is employed is because a high-strength interlayer y can be formed while preventing damage and deterioration of the metal support 1. In addition, the interlayer y is preferably calcinated at 1,050° C. or lower and still more preferably calcinated at 1,000° C. or lower. This is because the electrochemical element E can be formed while further preventing damage and deterioration of the metal support 1 as the calcination temperature of the interlayer y is lowered. The order of the interlayer smoothing step and the interlayer calcination step can be exchanged.

The interlayer smoothing step can also be carried out by performing a lap forming or leveling treatment, a surface cutting and polishing treatment, or the like.

(Electrolyte Layer Forming Step)

In an electrolyte layer forming step, the electrolyte layer B is formed as a thin layer on the interlayer y to cover the anode electrode layer A and the interlayer y. The electrolyte layer B can also be formed as a thin film having a thickness of 10 µm or less. The electrolyte layer B can be formed by appropriately using a low-temperature calcination method (a wet method with a calcination treatment in a low-temperature range of 1,100° C. or lower), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. Regardless of which method is used, it is desirable to carry out a method at a temperature of 1,100° C. or lower in order to prevent deterioration of the metal support 1.

In order to form a high-quality electrolyte layer B that is dense and that has high gastightness and gas barrier properties in a temperature range of 1,100° C. or lower, it is desirable that the electrolyte layer forming step is carried out by a spray coating method. In that case, a material for forming the electrolyte layer B is sprayed toward the interlayer y on the metal support 1 to form the electrolyte layer B.

(Reaction Preventing Layer Forming Step)

At the reaction preventing layer forming step, the reaction preventing layer z is formed on the electrolyte layer B as a thin layer. The reaction preventing layer z can be formed by appropriately using a low-temperature calcination method (a wet method with a calcination treatment in a low-temperature range of 1,100° C. or lower), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. Regardless of which method is used, it is desirable to carry out a method at a temperature of 1,100° C. or lower in order to prevent deterioration of the metal support 1. In order to flatten an upper surface of the reaction preventing layer z, for example, a leveling treatment or a surface cutting and polishing treatment may be performed after forming the reaction preventing layer z, or press processing may be performed after wet formation and before calcination.

(Cathode Electrode Layer Forming Step)

In a cathode electrode layer forming step, the cathode electrode layer C is formed in a thin layer on the reaction preventing layer z. The cathode electrode layer C can be formed by appropriately using a low-temperature calcination method (a wet method with a calcination treatment in a low-temperature range of 1,100° C. or lower), a spray coating method (a method such as a thermal spraying method, an aerosol deposition method, an aerosol gas deposition method, a powder jet deposition method, a particle jet deposition method, and a cold spraying method), a PVD method (a sputtering method, a pulsed laser deposition method, or the like), a CVD method, or the like. Regardless of which method is used, it is desirable to carry out a method at a temperature of 1,100° C. or lower in order to prevent deterioration of the metal support 1.

As described above, the electrochemical element E can be produced.

A form in which the electrochemical element E does not include either or both the interlayer y (insertion layer) and the reaction preventing layer z is possible. That is, a form in which the anode electrode layer A and the electrolyte layer B are formed to be in contact with each other or a form in which the electrolyte layer B and the cathode electrode layer C are formed to be in contact with each other is also possible. In this case, in the above-mentioned producing method, the interlayer forming step and the reaction preventing layer forming step are not provided. It is possible to add a step of forming another layer or to stack a plurality of layers of the same type, but in any case, it is desirable to perform the steps at a temperature of 1,100° C. or lower.

(Electrochemical Module M)

Figure 14:
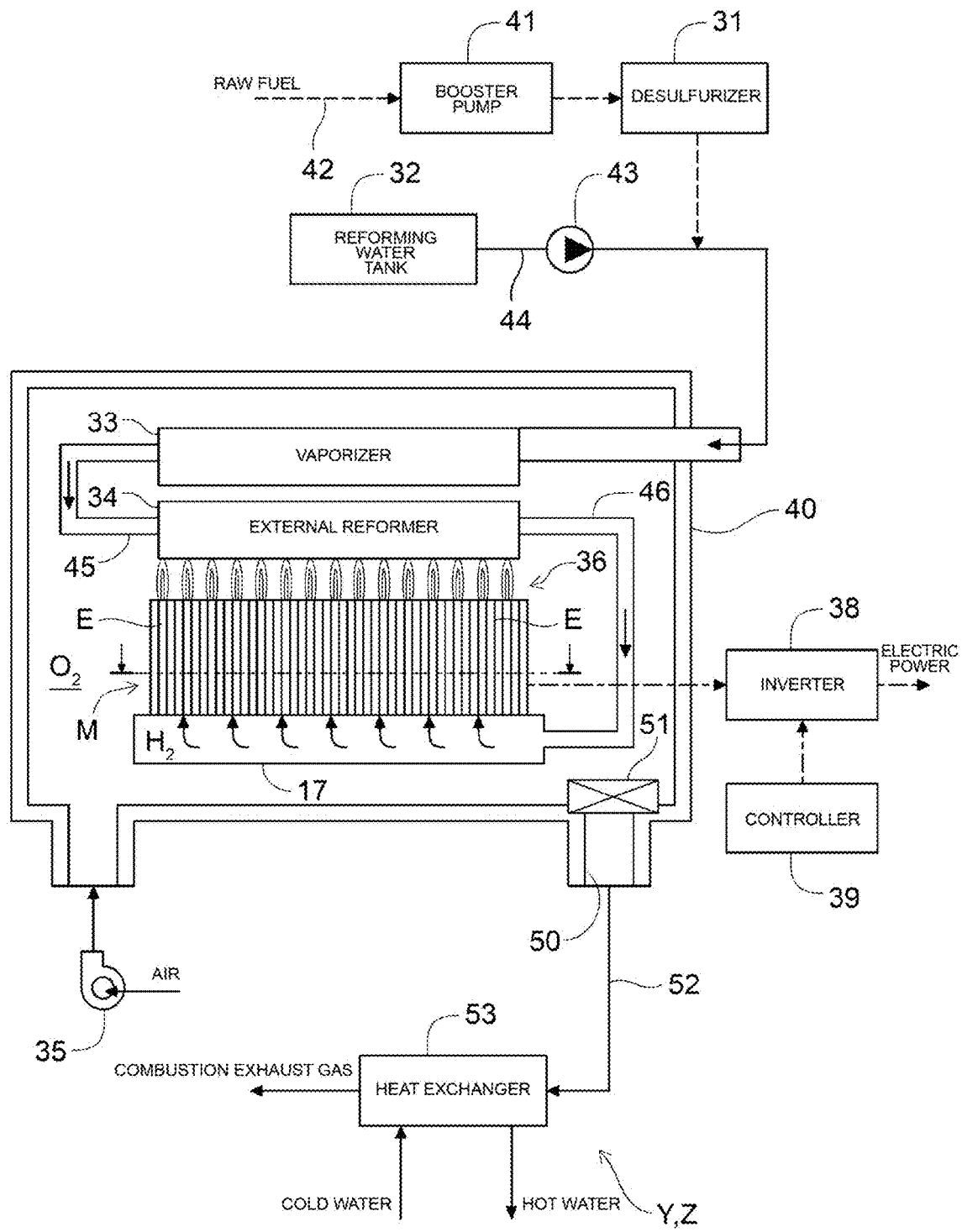
FIG. 14 is a schematic diagram illustrating a configuration of an electrochemical device and an energy system.

As illustrated in FIG. 14, the electrochemical module M includes a gas manifold 17, a current-collecting member 26, a terminal member, and a current extraction section. The plurality of stacked electrochemical elements E have open end portions on one side of the tubular support that are connected to the gas manifold 17, and gas is supplied from the gas manifold 17. The supplied gas flows into the tubular support and is supplied to the anode electrode layer A through the through-holes 2 of the metal support 1.

(Energy System Z and Electrochemical Device Y)

Figure 3:
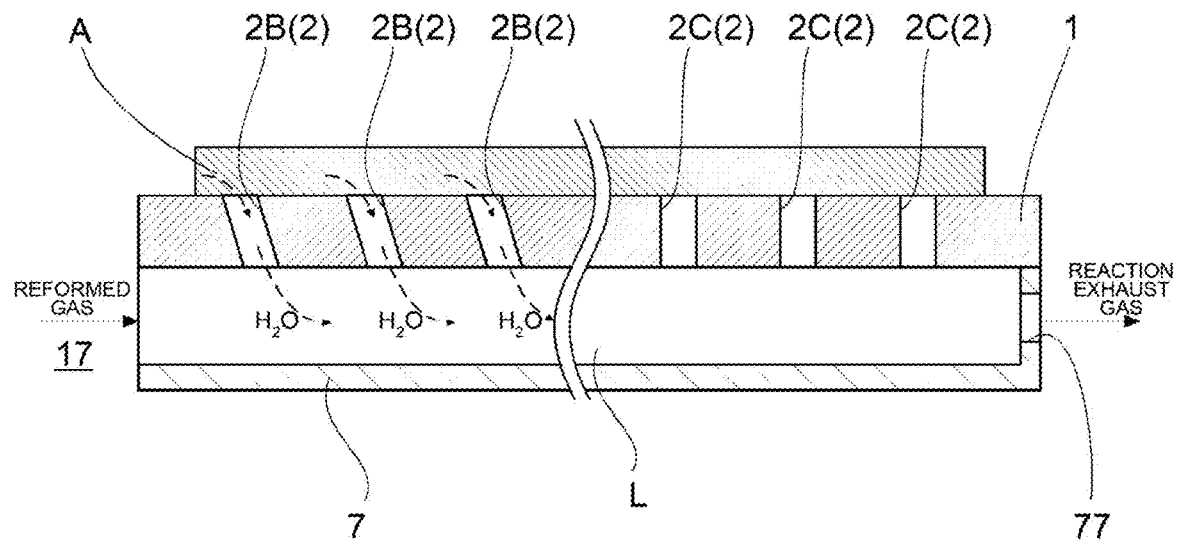
FIG. 3 is an enlarged cross-sectional view illustrating a shape and arrangement example of through-holes in the metal support.
Figure 4:
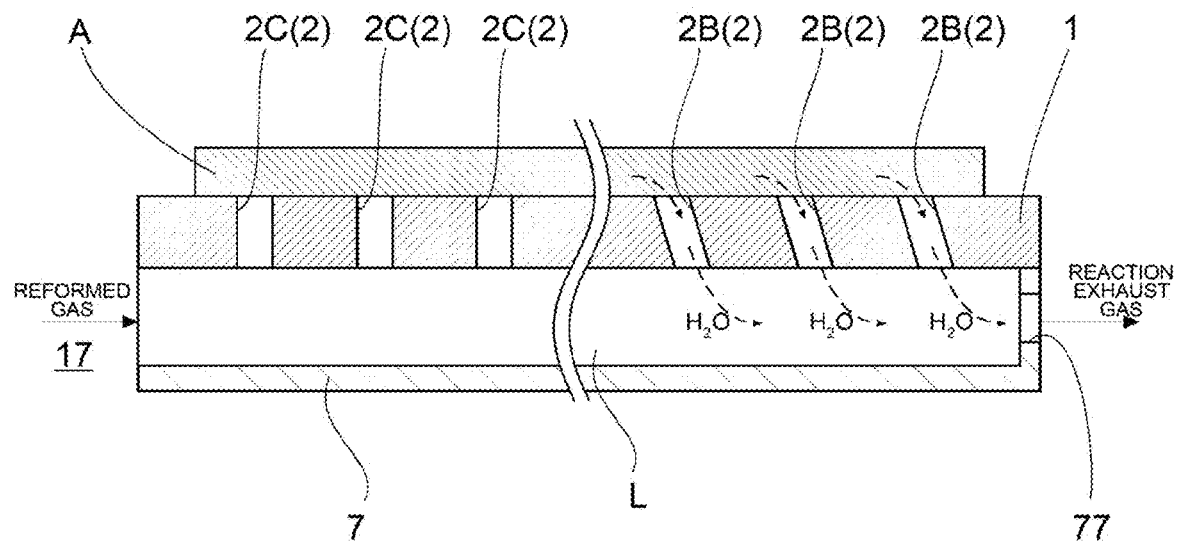
FIG. 4 is an enlarged cross-sectional view illustrating a shape and arrangement example of through-holes in the metal support.
Figure 5:
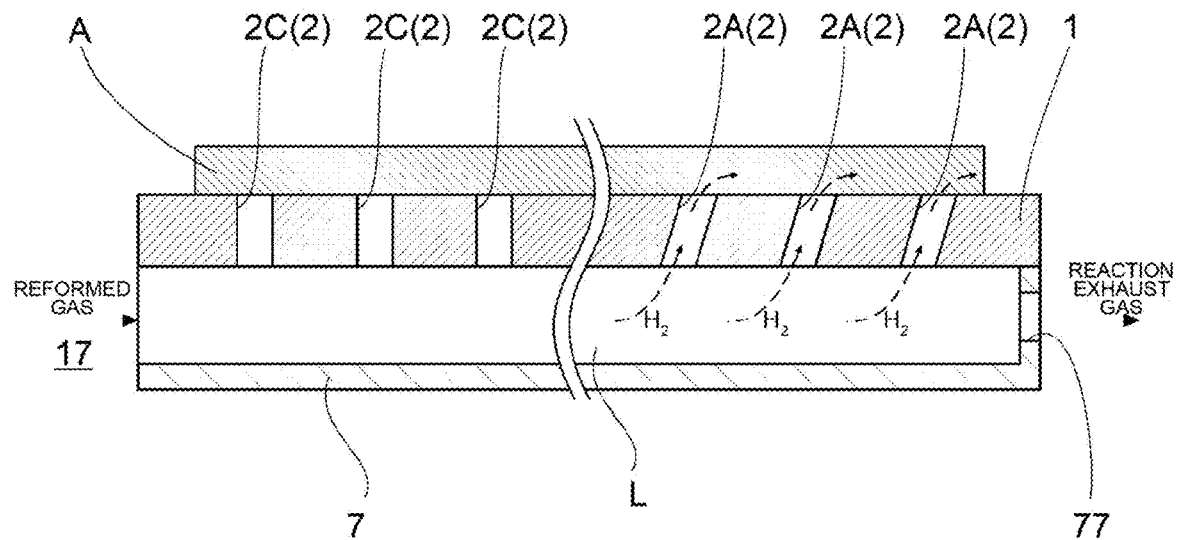
FIG. 5 is an enlarged cross-sectional view illustrating a shape and arrangement example of through-holes in the metal support.
Figure 6:
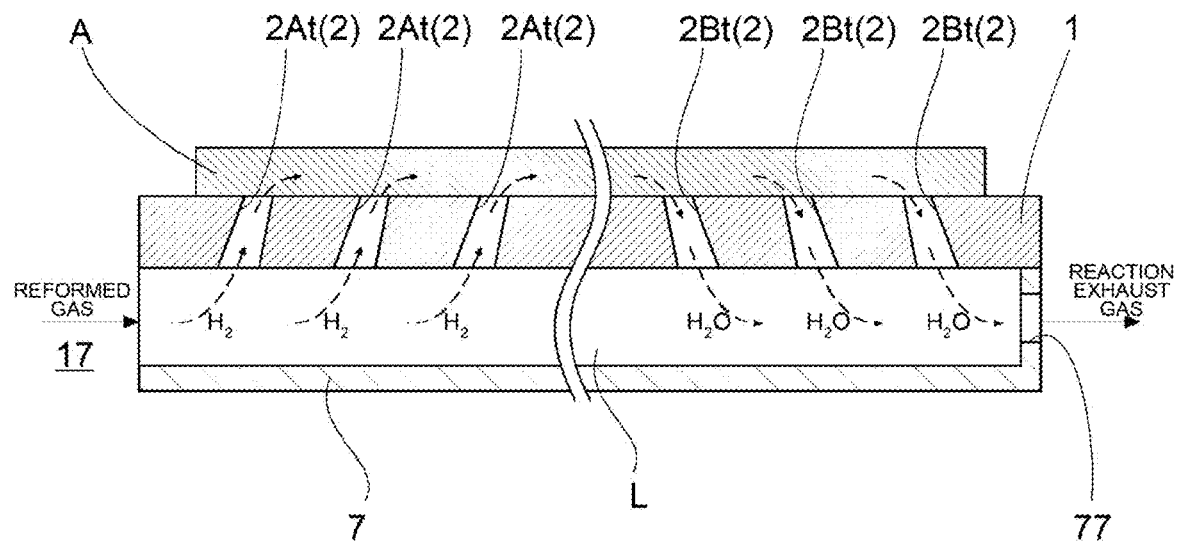
FIG. 6 is an enlarged cross-sectional view illustrating a shape and arrangement example of through-holes in the metal support.

As illustrated in FIG. 3, an energy system Z includes an electrochemical device Y and a heat exchanger 53 as an exhaust heat utilization section that reuses heat discharged from the electrochemical device Y.

The electrochemical device Y includes the electrochemical module M, a fuel supply section that includes a fuel converter formed with a desulfurizer 31 and an external reformer 34 and that supplies a fuel gas containing a reduction component to the electrochemical module M, and an inverter 38 (an example of the electric power converter) that extracts electric power from the electrochemical module M.

The electrochemical device Y includes the desulfurizer 31, a reforming water tank 32, a vaporizer 33, the external reformer 34, a blower 35, a combustion section 36, an inverter 38, a controller 39, a storage container 40, and the electrochemical module M.

The desulfurizer 31 removes (desulfurizes) a sulfur compound component contained in a hydrocarbon-based raw fuel such as a city gas. In a case where a sulfur compound is contained in a raw fuel, the desulfurizer 31 can be provided to prevent the influence of the sulfur compound on the external reformer 34 or the electrochemical elements E. The vaporizer (steam generator) 33 produces steam from reforming water supplied from the reforming water tank 32. The external reformer 34 steam-reforms a raw fuel desulfurized in the desulfurizer 31 by using the steam produced in the vaporizer 33 to produce a reformed gas containing hydrogen.

The electrochemical module M performs power generation by using a reformed gas supplied from the external reformer 34 and air supplied from the blower 35 to cause an electrochemical reaction between the reformed gas and the air. In the combustion section 36, a reaction exhaust gas discharged from the electrochemical module M is mixed with air to combust combustible components in the reaction exhaust gas.

The electrochemical module M includes the plurality of the electrochemical elements E and the gas manifold 17. The plurality of the electrochemical elements E are disposed in parallel in a state of being electrically connected to each other, and end portions on one side (lower end portions) of the electrochemical elements E are fixed to the gas manifold 17. The electrochemical element E performs power generation by causing electrochemically reaction between the reformed gas supplied through the gas manifold 17 and air supplied from the blower 35.

The inverter 38 adjusts output power of the electrochemical module M to electric power having the same voltage and the same frequency as those of electric power received from a commercial system (not illustrated). The controller 39 controls operations of the electrochemical device Y and the energy system Z.

The vaporizer 33, the external reformer 34, the electrochemical module M, and the combustion section 36 are housed in the storage container 40. The external reformer 34 reforms a raw fuel by using combustion heat generated by the combustion of the reaction exhaust gas in the combustion section 36.

The raw fuel is supplied to the desulfurizer 31 through the raw fuel supply channel 42 by an operation of a booster pump 41. The reforming water in the reforming water tank 32 is supplied to the vaporizer 33 through a reforming water supply channel 44 by an operation of a reforming water pump 43. The raw fuel supply channel 42 is joined at a location of downstream of the desulfurizer 31 into the reforming water supply channel 44, and supplies the reforming water and the raw fuel, which are joined at a location outside the storage container 40 to the vaporizer 33 provided inside the storage container 40.

The reforming water is vaporized by the vaporizer 33 to be steam. The raw fuel containing steam generated by the vaporizer 33 is supplied to the external reformer 34 through a steam-containing raw fuel supply channel 45. The raw fuel is steam-reformed in the external reformer 34 to generate a reformed gas (a first gas having a reduction component) containing a hydrogen gas as a main component. The reformed gas generated by the external reformer 34 is supplied to the gas manifold 17 of the electrochemical module M through a reformed gas supply channel 46.

The reformed gas supplied to the gas manifold 17 is distributed to the plurality of the electrochemical elements E, and is supplied from a lower end of a connection portion between the electrochemical elements E and the gas manifold 17 to the electrochemical elements E. Hydrogen (reduction component) in the reformed gas is mostly used for an electrochemical reaction in the electrochemical elements E. The reaction exhaust gas containing a residual hydrogen gas that is not used in the reaction is discharged from upper ends of the electrochemical elements E to the combustion section 36.

The reaction exhaust gas is combusted in the combustion section 36 and becomes a combustion exhaust gas, and the combustion exhaust gas discharged to the outside of the storage container 40 from a combustion exhaust gas outlet 50. A combustion catalyst section 51 (for example, a platinum-based catalyst) is disposed on the combustion exhaust gas outlet 50 to combust and remove reduction components such as carbon monoxide and hydrogen contained in the combustion exhaust gas. The combustion exhaust gas discharged from the combustion exhaust gas outlet 50 is transmitted to the heat exchanger 53 through a combustion exhaust gas discharge channel 52.

The heat exchanger 53 exchanges heat between the combustion exhaust gas generated by combustion in the combustion section 36 and cold water supplied to produce hot water. That is, the heat exchanger 53 operates as an exhaust heat utilization section for reusing the heat discharged from the electrochemical device Y.

In addition, instead of the exhaust heat utilization section, a reaction exhaust gas utilization section may be provided for utilizing the reaction exhaust gas discharged (without combustion) from the electrochemical module M. The reaction exhaust gas contains a residual hydrogen gas that has not been used in the reaction in the electrochemical elements E. In the reaction exhaust gas utilization section, the residual hydrogen gas is used to utilize heat by combustion and power generation by a fuel cell or the like, so that energy can be effectively utilized.

[Another Embodiment]

Another embodiment of the present invention will be described. Configurations of individual embodiments described below are not limited to a single application, and applications in combination with configurations of another embodiment can also be adopted.

Figure 15:
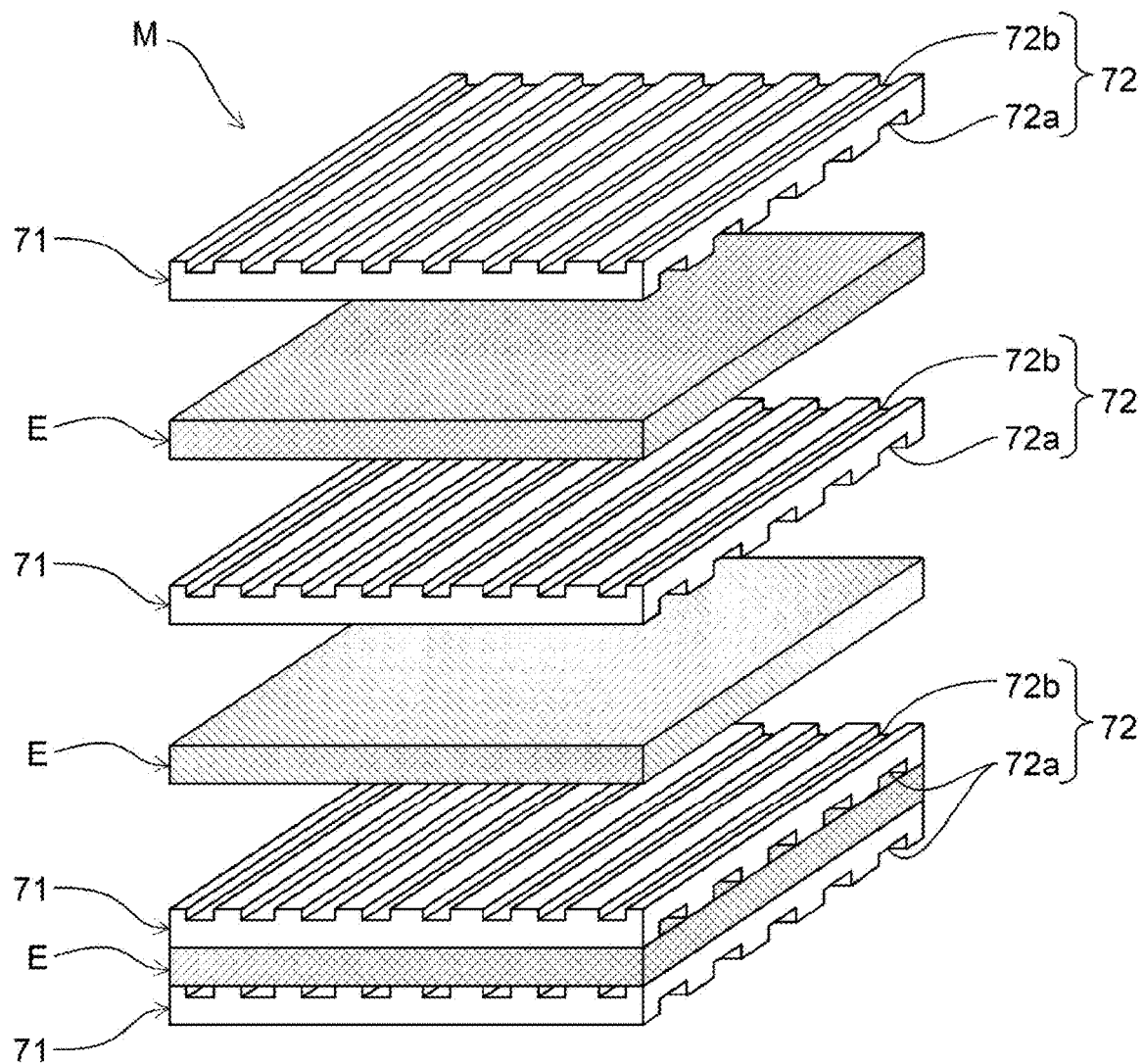
FIG. 15 is a schematic diagram illustrating a configuration of an electrochemical module according to another embodiment.

(1) Another embodiment of the electrochemical module M is illustrated in FIG. 15. Regarding the electrochemical module M, the electrochemical module M is configured to stack the above-mentioned electrochemical elements E so that an intercell connection member 71 is interposed therebetween.

The intercell connection member 71 is a plate-shaped member having conductivity and no gas permeability, and grooves 72 orthogonal to each other are formed on the front surface and the back surface. As the intercell connection member 71, a metal such as stainless or a metal oxide can be used.

As illustrated in FIG. 15, in a case where the electrochemical elements E are stacked so that the intercell connection member 71 is interposed therebetween, a gas can be supplied to the electrochemical elements E through the grooves 72. Specifically, the grooves 72 on one side are first gas flow channels 72a to supply a gas to the front side of each electrochemical element E, that is, the cathode electrode layer C. The grooves 72 on the other side are second gas flow channels 72b, and a gas is supplied to the anode electrode layer A from the back side of each electrochemical element E, that is, the back surface of the metal support 1 through the through-holes 2 (see FIG. 1).

In a case where this electrochemical module M is operated as a fuel cell, oxygen is supplied to the first gas flow channels 72a and hydrogen is supplied to the second gas flow channels 72b. Then, a reaction in the electrochemical module M as a fuel cell proceeds in the electrochemical elements E, and electromotive force and current are generated. The generated electric power is extracted from the intercell connection members 71 on both ends of the stacked electrochemical elements E to the outside of the electrochemical module M.

In the form illustrated in FIG. 15, the grooves 72 orthogonal to each other are formed on the front surface and the back surface of each intercell connection member 71, but the grooves 72 parallel to each other can also be formed on the front surface and the back surface of the intercell connection member 71.

(2) In the above-mentioned embodiment, the electrochemical element E is used for the SOFC single cell, but the electrochemical element E can also be used for a solid oxide electrolysis cell, an oxygen sensor obtained by using a solid oxide, or the like.

That is, in the above-mentioned embodiment, the configuration capable of improving the efficiency of converting chemical energy such as fuel into electric energy has been described.

That is, in the above-mentioned embodiment, the electrochemical elements E and the electrochemical module M are operated as a fuel cell, a hydrogen gas is supplied to the anode electrode layer A, and an oxygen gas is supplied to the cathode electrode layer C. Then, in the cathode electrode layer C, oxygen molecules $O_2$ react with electrons $e^-$ to generate oxygen ions $O^{2-}$. The oxygen ions $O^{2-}$ move to the anode electrode layer A through the electrolyte layer B. In the anode electrode layer A, the hydrogen molecules $H_2$ react with the oxygen ions $O^{2-}$ to generate water $H_2O$ and electrons $e^-$. As a result of the above reaction, an electromotive force is generated between the anode electrode layer A and the cathode electrode layer C to perform power generation.

On the other hand, in a case where the electrochemical elements E and the electrochemical module M are operated as the electrolysis cell, a gas containing steam or carbon dioxide is supplied to the anode electrode layer A, and a voltage is applied between the anode electrode layer A and the cathode electrode layer C. Then, electrons $e^-$ react with water molecules $H_2O$ and carbon dioxide molecules CO2 in the anode electrode layer A to form hydrogen molecules $H_2$, carbon monoxide CO, and oxygen ions $O^{2-}$. The oxygen ions $O^{2-}$ move to the cathode electrode layer C through the electrolyte layer B. In the cathode electrode layer C, oxygen ions $O^{2-}$ emit electrons to be oxygen molecules $O_2$. According to the above-mentioned reaction, the water molecules $H_2O$ are electrolyzed into hydrogen $H_2$ and oxygen $O_2$, and in a case where a gas containing carbon dioxide molecules CO2 flows, carbon dioxide molecules $CO_2$ are electrolyzed into carbon monoxide CO and oxygen $O_2$.

In a case where a gas containing steam and carbon dioxide molecules $CO_2$ flows, it is possible to provide a fuel converter 91 that synthesizes various compounds such as hydrocarbons from hydrogen, carbon monoxide, and the like generated through the above-mentioned electrolysis in the electrochemical elements E and the electrochemical module M. The fuel supply section (not illustrated) extracts hydrocarbon and the like produced by this fuel converter 91 to the outside of the system and the device, to be used as a fuel or the like. Moreover, hydrogen and carbon monoxide can also be converted into a chemical raw material by the fuel converter 91, and the resulting chemical raw material can be used.

Figure 16:
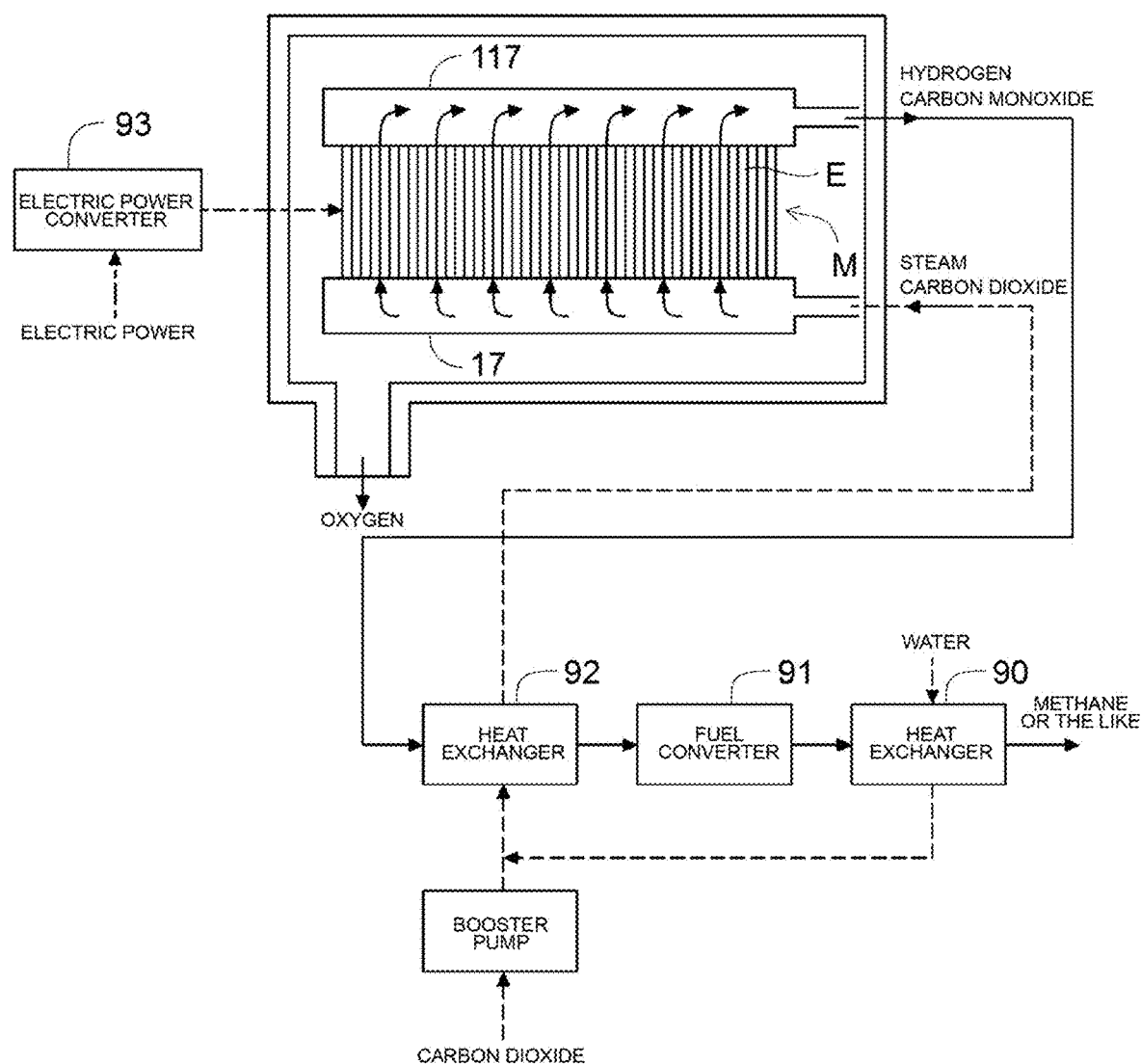
FIG. 16 is a schematic diagram illustrating a configuration of an electrochemical device and an energy system according to another embodiment.

In the energy system illustrated in FIG. 16, the electrochemical module M includes the plurality of electrochemical elements E, the gas manifold 17, and a gas manifold 171. The plurality of the electrochemical elements E are disposed in parallel in a state of being electrically connected to each other, end portions on one side (lower end portions) of the electrochemical elements E are fixed to the gas manifold 17, and end portions on the other side (upper end portions) are fixed to the gas manifold 171. The gas manifold 17 at the one end portions (lower end portions) of the electrochemical elements E receives steam and carbon dioxide. Then, hydrogen, carbon monoxide, and the like generated by the above-mentioned reaction in the electrochemical element E are collected by the manifold 171 communicating with end portions on the other side (upper end portions) of the electrochemical elements E.

The heat exchanger 90 in FIG. 16 is configured to be operated as an exhaust heat utilization section that performs heat exchange between reaction heat generated by a reaction occurring in the fuel converter 91 and water to cause vaporization, and the heat exchanger 92 in FIG. 16 is configured to be electrically operated as the exhaust heat utilization section that performs heat exchange between exhaust heat generated by the electrochemical elements E, and steam and carbon dioxide to carry out preheat; thereby, the energy efficiency can be improved.

Moreover, the electric power converter 93 supplies electric power to the electrochemical elements E. As a result, the electrochemical elements E function as an electrolysis cell as described above.

Therefore, according to the above configurations, it is possible to provide the electrochemical elements E or the like, which can improve the efficiency of converting electric energy into chemical energy such as fuel.

(3) In the above embodiment, as a material of the anode electrode layer A, for example, a composite material such as NiO-GDC, Ni-GDC, NiO-YSZ, Ni-YSZ, $CuO-CeO_2$, or $Cu-CeO_2$ was used, and as a material of the cathode electrode layer C, for example, a composite oxide such as LSCF or LSM was used. The electrochemical elements E configured in this way can supply the hydrogen gas to the anode electrode layer A to serve as a fuel electrode (anode), can supply air to the cathode electrode layer C to form an air electrode (cathode), and can serve as a single SOFC. It is also possible to modify this configuration to configure the electrochemical elements E so that the anode electrode layer A can serve as an air electrode, and the cathode electrode layer C can serve as a fuel electrode. That is, a composite oxide such as LSCF or LSM is used as a material of the anode electrode layer A, and for example, a composite material such as NiO-GDC, Ni-GDC, NiO-YSZ, Ni-YSZ, $CuO-CeO_2$, or $Cu-CeO_2$ is used as a material of the cathode electrode layer C. In the electrochemical elements E configured as described above, air can be supplied to the anode electrode layer A to serve as an air electrode, a hydrogen gas can be supplied to the cathode electrode layer C to serve as a fuel electrode, and the electrochemical elements E can be used as a single SOFC.

(4) In the above embodiment, a flat plate type or a cylindrical flat plate type solid oxide fuel cell (SOFC) is mainly used as the electrochemical element E, but an electrochemical element such as a cylindrical solid oxide fuel cell can also be used.

(5) In the above embodiment, the electrochemical device Y includes the electrochemical module M including the plurality of electrochemical elements E. However, the electrochemical device Y of the above-mentioned embodiment can also be applied to a configuration including one electrochemical element E.

(6) In the above embodiment, the electrochemical element E has a U-shaped member 7 attached to the back surface of the metal support 1, and the tubular support is formed of two members of the metal support 1 and the u-shaped member 7, but a configuration in which one member may be used to integrally form the metal support 1 and the U-shaped member 7 may be adopted, thereby forming the tubular support, and three or more members may be used to form the tubular support.

Moreover, the U-shaped member 7 may not be provided, and a configuration in which the anode electrode layer A or the like may be supported by the metal support 1 may be adopted.

REFERENCE SIGNS LIST

1: Metal support
1a: Front surface
1b: Back surface
2: Through-hole
2A and 2At: First inclined through-hole
2B and 2Bt: Second inclined through-hole
91: Fuel converter
93: Electric power converter
A: Anode electrode layer (electrode layer)
Aa: Insertion section
B: Electrolyte layer
C: Cathode electrode layer
E: Electrochemical element
F: Gas flow direction
L: Gas flow channel
M: Electrochemical module
Y: Electrochemical device
Z: Energy system

The invention claimed is:

1. A metal support that is formed in a plate shape as a whole, comprising:
a plurality of through-holes penetrating from a front surface on which an electrode layer is provided to a back surface,
wherein the metal support has inclined through-holes, as the through-holes, each of which has a central axis inclined with respect to a thickness direction,
wherein a gas flow channel through which a gas supplied to and received from the electrode layer flows is provided along the back surface of the metal support,
wherein in the gas flow channel, gas flows along a gas flow direction from an inlet provided at an upstream end to an outlet provided at a downstream end, and
as the inclined through-holes, the metal support has a first inclined through-hole of which an opening on a front side of the metal support is positioned at further downstream of the gas flow channel in a gas flow direction than an opening on a back side of the metal support.

2. The metal support according to claim 1, wherein,
as the inclined through-holes, the metal support has a first inclined through-hole and a second inclined through-hole,
the first inclined through-hole is inclined in a state in which an opening on a front side of the metal support is positioned at further downstream of the gas flow channel in a gas flow direction than an opening on a back side of the metal support, and
the second inclined through-hole is inclined in a state in which an opening on the back side of the metal support is positioned at further downstream of the gas flow channel in the gas flow direction than an opening on the front side of the metal support.

3. The metal support according to claim 2,
wherein each of the inclined through-holes is formed to have an opening area on the front side of the metal support smaller than an opening area on the back side of the metal support.

4. The metal support according to claim 1,
wherein the electrode layer comprises an insertion section inserted into each of the inclined through-holes.

5. An electrochemical element comprising:
the metal support according to claim 1,
wherein the electrode layer, an electrolyte layer, and a counter electrode layer are provided on the front surface of the metal support.

6. The electrochemical element according to claim 5, wherein a turbulence promoter that disturbs a flow in the gas flow channel is provided in at least a part of the gas flow channel through which a gas supplied to and received from the electrode layer flows.

7. The electrochemical element according to claim 5,
wherein a catalytic reaction section that reforms a fuel gas is provided in at least a part of the gas flow channel through which a gas supplied to and received from the electrode layer flows.

8. An electrochemical module comprising:
a plurality of electrochemical elements according to claim 5,
wherein the plurality of electrochemical elements are disposed in an assembled state.

9. An electrochemical device comprising:
at least one electrochemical element according to claim 5; and
a fuel converter that supplies a gas containing a reduction component to the at least one electrochemical element, or a fuel converter that converts a gas containing a reduction component generated from the at least one electrochemical element.

10. An energy system comprising:
the electrochemical device according to claim 9; and
an exhaust heat utilization section that reuses heat discharged from the electrochemical device.

11. An electrochemical device comprising:
at least one electrochemical element according to claim 5; and
an electric power converter that extracts electric power from the at least one electrochemical element or that supplies electric power to the at least one electrochemical element.

12. A solid oxide fuel cell comprising:
the electrochemical element according to claim 5,
wherein the solid oxide fuel cell causes a power generation reaction by using the electrochemical element.

13. A solid oxide electrolysis cell comprising:
the electrochemical element according to claim 5,
wherein the solid oxide electrolysis cell causes an electrolysis reaction by using the electrochemical element.

14. A method for producing the metal support according to claim 1, wherein
any of laser processing, punching processing, or etching processing, or a combination thereof is carried out on a metal material plate to form a plurality of through-holes penetrating from a front side to a back side of the metal support.

15. A metal support that is formed in a plate shape as a whole, comprising:
a plurality of through-holes penetrating from a front surface on which an electrode layer is provided to a back surface,
wherein the metal support has inclined through-holes, as the through-holes, each of which has a central axis inclined with respect to a thickness direction,
wherein a gas flow channel through which a gas supplied to and received from the electrode layer flows is provided along the back surface of the metal support,
wherein in the gas flow channel, gas flows along a gas flow direction from an inlet provided at an upstream end to an outlet provided at a downstream end, and as the inclined through-holes, the metal support has a second inclined through-hole of which an opening on a back side of the metal support is positioned at further downstream of the gas flow channel in a gas flow direction than an opening on a front side of the metal support.

* * * * *